(12) United States Patent
Holmes

(10) Patent No.: US 9,802,437 B2
(45) Date of Patent: Oct. 31, 2017

(54) SECURITY DEVICE AND METHOD OF MANUFACTURE

(71) Applicant: DE LA RUE INTERNATIONAL LIMITED, Basingstoke, Hampshire (GB)

(72) Inventor: Brian Holmes, Fleet (GB)

(73) Assignee: DE LA RUE INTERNATIONAL LIMITED, Hampshire (GB)

( * ) Notice: Subject to any disclaimer, the term of this patent is extended or adjusted under 35 U.S.C. 154(b) by 107 days.

(21) Appl. No.: 14/907,943

(22) PCT Filed: Jul. 25, 2014

(86) PCT No.: PCT/GB2014/052286
§ 371 (c)(1),
(2) Date: Jan. 27, 2016

(87) PCT Pub. No.: WO2015/011494
PCT Pub. Date: Jan. 29, 2015

(65) Prior Publication Data
US 2016/0176221 A1 Jun. 23, 2016

(30) Foreign Application Priority Data
Jul. 26, 2013 (GB) .................................. 1313363.2

(51) Int. Cl.
*B42D 25/00* (2014.01)
*B42D 25/355* (2014.01)
(Continued)

(52) U.S. Cl.
CPC ........... *B42D 25/355* (2014.10); *B42D 25/00* (2014.10); *B42D 25/23* (2014.10); *B42D 25/24* (2014.10);
(Continued)

(58) Field of Classification Search
USPC ......................................................... 359/619
See application file for complete search history.

(56) References Cited

U.S. PATENT DOCUMENTS 4,652,015 A 3/1987 Crane
4,892,336 A 1/1990 Kaule et al.
(Continued)

FOREIGN PATENT DOCUMENTS

CA 2732976 A1 2/2010
EP 0 059 056 A1 9/1982
(Continued)

OTHER PUBLICATIONS

Nov. 3, 2014 International Search Report issued in International Patent Application No. PCT/GB2014/052286.
(Continued)

*Primary Examiner* — Kyle Grabowski
(74) *Attorney, Agent, or Firm* — Oliff PLC

(57) ABSTRACT

A security device is presented, including: an array of focusing elements, each focusing element being adapted to focus light in at least two orthogonal directions, the focusing elements being arranged on a regular two-dimensional grid; and an array of elongate image elements overlapping the array of focusing elements, configured such that each focusing element can direct light from any one of a respective set of at least two elongate image elements to the viewer, in dependence on the viewing angle. In a first region of the security device, the elongate image elements extend along a first direction, and in a second region of the security device, the elongate image elements extend along a second direction which is different to the first direction.

22 Claims, 14 Drawing Sheets

(51) Int. Cl.
*G02B 3/00* (2006.01)
*B42D 25/29* (2014.01)
*G07D 7/12* (2016.01)
*B42D 25/23* (2014.01)
*B42D 25/24* (2014.01)
*B42D 25/328* (2014.01)
*G07D 7/00* (2016.01)

(52) U.S. Cl.
CPC ........... *B42D 25/29* (2014.10); *B42D 25/328* (2014.10); *G02B 3/0056* (2013.01); *G02B 3/0068* (2013.01); *G07D 7/003* (2017.05); *G07D 7/12* (2013.01); *B42D 2033/04* (2013.01); *B42D 2033/06* (2013.01); *B42D 2033/20* (2013.01); *B42D 2035/24* (2013.01); *B42D 2035/44* (2013.01)

(56) References Cited

U.S. PATENT DOCUMENTS

| | | | |
|---|---|---|---|
| 6,856,462 B1 | 2/2005 | Scarbrough et al. | |
| 7,808,710 B2* | 10/2010 | Hansen | B42D 25/30 359/619 |
| 2007/0273143 A1* | 11/2007 | Crane | B42D 25/346 283/72 |
| 2009/0322071 A1 | 12/2009 | Dichtl | |
| 2014/0226212 A1* | 8/2014 | Lister | B42D 25/29 359/625 |
| 2015/0146297 A1* | 5/2015 | Commander | B42D 25/30 359/619 |

FOREIGN PATENT DOCUMENTS

| | | |
|---|---|---|
| EP | 0 860 298 A2 | 8/1998 |
| EP | 1 398 174 A1 | 3/2004 |
| EP | 2460667 A2 | 6/2012 |
| WO | 83/00659 A1 | 3/1983 |
| WO | 94/27254 A1 | 11/1994 |
| WO | 95/10419 A1 | 4/1995 |
| WO | 95/10420 A1 | 4/1995 |
| WO | 00/039391 A1 | 7/2000 |
| WO | 03/054297 A2 | 7/2003 |
| WO | 03/091952 A2 | 11/2003 |
| WO | 03/091953 A2 | 11/2003 |
| WO | 03/095188 A2 | 11/2003 |
| WO | 2005/052650 A2 | 6/2005 |
| WO | 2005/106601 A2 | 11/2005 |
| WO | 2005/115119 A2 | 12/2005 |
| WO | 2008/000350 A1 | 1/2008 |
| WO | 2011/015384 A1 | 2/2011 |
| WO | 2011/051668 A1 | 5/2011 |
| WO | 2011/051669 A1 | 5/2011 |
| WO | 2011/051670 A2 | 5/2011 |
| WO | 2011/102800 A1 | 8/2011 |
| WO | 2011/107782 A1 | 9/2011 |
| WO | 2011/107783 A1 | 9/2011 |
| WO | 2012/027779 A1 | 3/2012 |
| WO | 2013/054117 A1 | 4/2013 |
| WO | 2013/054119 A1 | 4/2013 |
| WO | 2014/085290 A1 | 6/2014 |

OTHER PUBLICATIONS

Jan. 24, 2014 Search Report issued in British Patent Application No. 1313363.2.
Jan. 7, 2015 Search Report issued in British Patent Application No. 1413234.4.
Jan. 26, 2016 International Preliminary Report on Patentability issued in International Patent Application No. PCT/GB2014/052286.

\* cited by examiner

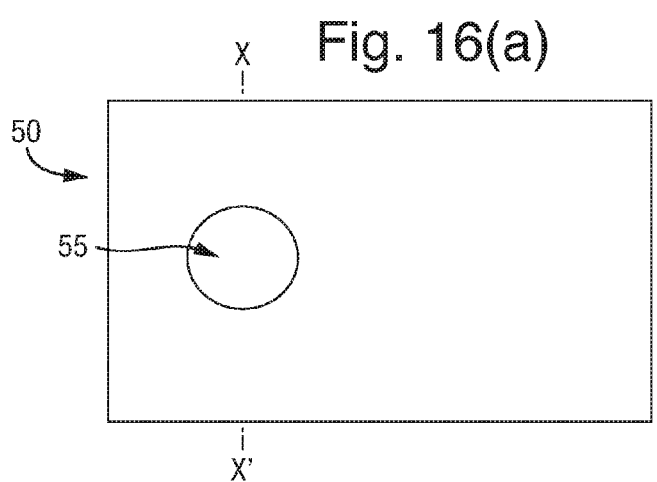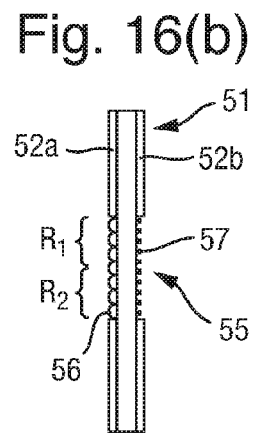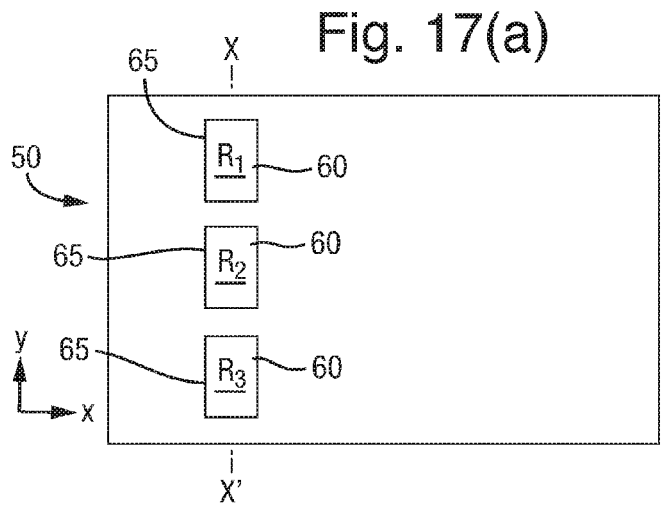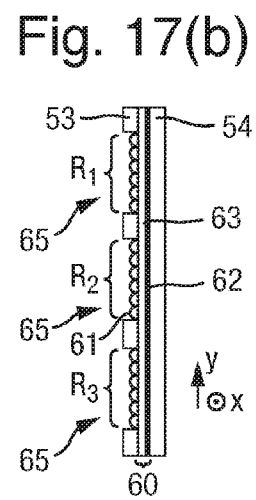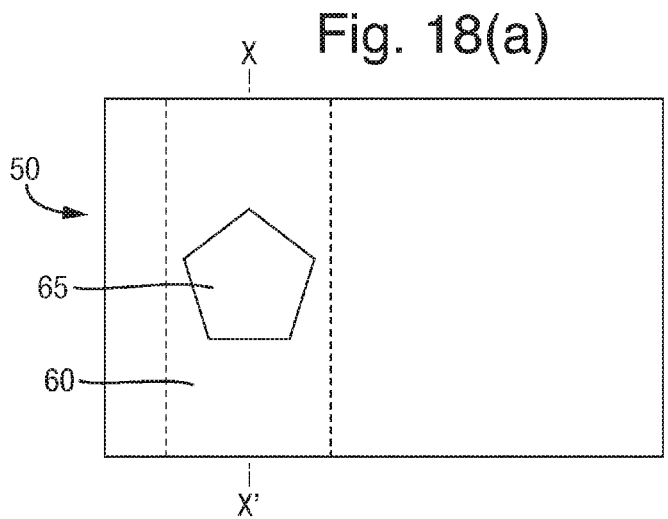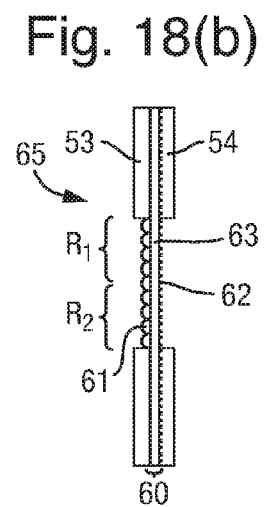

SECURITY DEVICE AND METHOD OF MANUFACTURE

This invention relates to security devices, for example for use on articles of value such as banknotes, cheques, passports, identity cards, certificates of authenticity, fiscal stamps and other documents of value or personal identity. Methods of manufacturing such security devices are also disclosed.

Articles of value, and particularly documents of value such as banknotes, cheques, passports, identification documents, certificates and licences, are frequently the target of counterfeiters and persons wishing to make fraudulent copies thereof and/or changes to any data contained therein. Typically such objects are provided with a number of visible security devices for checking the authenticity of the object. Examples include features based on one or more patterns such as microtext, fine line patterns, latent images, venetian blind devices, lenticular devices, moiré interference devices and moiré magnification devices, each of which generates a secure visual effect. Other known security devices include holograms, watermarks, embossings, perforations and the use of colour-shifting or luminescent/fluorescent inks. Common to all such devices is that the visual effect exhibited by the device is extremely difficult, or impossible, to copy using available reproduction techniques such as photocopying. Security devices exhibiting non-visible effects such as magnetic materials may also be employed.

One class of security devices are those which produce an optically variable effect, meaning that the appearance of the device is different at different angles of view. Such devices are particularly effective since direct copies (e.g. photocopies) will not produce the optically variable effect and hence can be readily distinguished from genuine devices. Optically variable effects can be generated based on various different mechanisms, including holograms and other diffractive devices, and also devices which make use of focusing elements such as lenses, including moiré magnifier devices and so-called lenticular devices.

Moiré magnifier devices (examples of which are described in EP-A-1695121, WO-A-94/27254, WO-A-2011/107782 and WO2011/107783 ) make use of an array of micro-focusing elements (such as lenses or mirrors) and a corresponding array of microimage elements, wherein the pitches of the micro-focusing elements and the array of microimage elements and their relative locations are such that the array of micro-focusing elements cooperates with the array of microimage elements to generate a magnified version of the microimage elements due to the moiré effect. Each microimage element is a complete, miniature version of the image which is ultimately observed, and the array of focusing elements acts to select and magnify a small portion of each underlying microimage element, which portions are combined by the human eye such that the whole, magnified image is visualised. This mechanism is sometimes referred to as "synthetic magnification".

Lenticular devices on the other hand do not involve synthetic magnification. An array of focusing elements, typically cylindrical lenses, overlies a corresponding array of image elements, or "slices", each of which depicts only a portion of an image which is to be displayed. Image slices from two or more different images are interleaved and, when viewed through the focusing elements, at each viewing angle, only a selected set of image slices will be directed towards the viewer. In this way, different composite images can be viewed at different angles. However it should be appreciated that no magnification typically takes place and the resulting image which is observed will be of substantially the same size as that to which the underlying image slices are formed. Some examples of lenticular devices are described in U.S. Pat. No. 4,892,336, WO-A-2011051670, WO-A-2012/027779, WO-A-2012/027779 and U.S. Pat. No. 6,856462.

Lenticular devices have the advantage that different images can be displayed at different viewing angles, giving rise to the possibility of animation and other striking visual effects which are not possible using the moiré magnifier technique. Nonetheless, new devices with different appearances and effects are constantly sought in order to stay ahead of would-be counterfeiters.

The present invention provides a security device comprising:
   an array of focusing elements, each focusing element being adapted to focus light in at least two orthogonal directions, the focusing elements being arranged on a regular two-dimensional grid; and
   an array of elongate image elements overlapping the array of focusing elements, configured such that each focusing element can direct light from any one of a respective set of at least two elongate image elements to the viewer, in dependence on the viewing angle;
   wherein in a first region of the security device, the elongate image elements extend along a first direction, and in a second region of the security device, the elongate image elements extend along a second direction which is different to the first direction.

The invention further provides a method of manufacturing a security device, the method comprising providing the said array of focusing elements, and overlapping this with the said array of elongate image elements.

By arranging the elongate image elements ("slices" or "strips") making up the image element array to extend along two different directions in two respective regions of the device, a strong visual impact can be achieved since the two regions will exhibit different effects from one another as the device is tilted in any one direction. In particular, when the device is tiled about an axis parallel with either the first or second direction, a lenticular transition effect will be observed from the region of the device in which the elongate image elements are parallel to that direction, but no or a different effect will be observed from the other.

It should be appreciated that the disclosed security device is an example of a lenticular device as described above, and as such each elongate image element is a portion (e.g. an individual pixel, or a group or line of pixels) of a corresponding image, not a miniature version of the corresponding image (as would be the case in a moiré magnifier type device). The focusing elements preferably do not perform any magnification. Each of the at least two image elements making up each set is a portion of a corresponding image and, at any one viewing angle, the focusing elements in the first region will all direct light from elements of one image to the viewer, so that in combination, the selected image elements display that image to the viewer across the first region. Likewise, in the second region, all the focusing elements will direct light from elements of another image to the viewer, the combination giving rise to the display of that image across the second region. Each image could be a graphic such as a letter, number, portrait etc. (further examples will be given below), or could be a block colour.

Visual effects of the sort produced by the present invention have previously been achieved using two adjacent lenticular security devices based on cylindrical lenses, one having the lenses and image strips aligned along a first direction and the other having the lenses and image strips aligned along a second, different, direction as described in WO-A-2011/051669. However this requires the formation of two different lens arrays with different orientations and registration between the lens arrays and image slices at least to the extent that those provided for each respective device are correspondingly aligned. Whilst this high level of manufacturing difficulty itself acts as a bar to counterfeiting, it also increases the cost of manufacture. There is a need for a device of simpler construction yet which maintains a strong visual impact and the present invention achieves this through the use of an array of focusing elements which focus light in two orthogonal directions (e.g. spherical lenses), in combination with the above-described elongate image element array with region-wise directionality. Since the focusing element array can be the same in both regions of the device, a single continuous array can be formed (if desired) and overlapped with the image element array which alone defines the two (or more) regions. As such, the requirement for registration between the focusing element array and image element array is also reduced or eliminated. All that is required is that, at any one viewing angle, all of the focussing elements within the first region of the device direct light from image elements all of which correspond to one image, and all of the focussing elements within the second region of the device direct light from image elements all of which correspond to another (single) image (which may or may not be the same as in the first region).

Preferably this is achieved by the (one-dimensional) periodicity and orientation of the image element array and focusing element array being substantially matched, as the case in conventional lenticular devices. Alternatively, if it is desired to arrange the focusing element array at a slanted angle to the image element array, the elongate image elements should be further interlaced, e.g. as disclosed in WO-A-2014/085290, to achieve the same result.

By "elongate" it is meant that the individual image elements are longer in one direction than in the other (orthogonal) direction. As such, the image elements may commonly be referred to as image "slices" or image "strips". The periodicity of the image element array lies in the direction orthogonal to the long direction of the elongate elements, within each region. Typically each image element may extend from one side to the opposite side of the footprint of the corresponding focusing element, with the two or more image elements forming the respective set lying parallel to one another.

The first and second directions along which the elongate elements are arranged in the first and second regions respectively are preferably orthogonal. This is advantageous since, when the device is tilted about either the first or second direction, the corresponding region will display the lenticular effect whilst no lenticular effect will be observed from the other region. However, other angular separations between the two directions could be used. It may also be desirable to define more than two regions, each with their elongate image elements arranged along different (non-parallel) directions so that (for example) when tilted, one region may show no change whilst two other regions show two different changes. In this way complex security effects can be achieved through appropriate configuration of the image element array without need for changes to the focusing element array.

Preferably, as mentioned above, the array of focusing elements is continuous across and between the first and second regions. This further reduces the need for registration between the focusing element array and the image element array, since there is no need to align a particular portion of the focusing element array with the elongate image elements in either region. Also, if desired, a unitary, pre-manufactured focusing element array (such as a sheet of moulded lenses) can be used to form the whole security device, with the image elements being applied to the opposite surface of the sheet (for example). It is also preferable that the array of elongate image elements is continuous across and between the first and second regions (save for the required change in direction).

The two regions could in principle be located at any positions relative to one another in order to form the security device, including for instance at spaced locations on an article such as a document of value. However in preferred embodiments, the first and second regions are arranged adjacent one another and preferably abut one another. This makes it easier to locate the regions and to compare the effects they produce when tilting the device. Also, the two regions can be designed to co-operate with one another to produce particular visual effects.

The nature of the images displayed by the device at different tilt angles can be selected as appropriate for the desired visual effect. In one advantageous implementation, the array of elongate image elements is configured such that the first region or the second region, or both, displays a series of at least two different images as the security device is tilted about an axis parallel to the direction along which the elongate image elements extend in the respective region. The images could be related or non-related. For instance, the images could be different views of the same object, to give the impression of viewing a three-dimensional object as the device is tilted, or the images could be different sized images of the same object, to give the impression of "zooming" into or out from the image. In another case, the images could be arranged to change in gradual steps from a view of a first object to a view of a second object ("morphing").

The different images could also be different colours. Thus, in one embodiment, the array of elongate image elements is configured such that the first region or the second region, or both, displays a series of at least two different colours as the security device is tilted about an axis parallel to the direction along which the elongate image elements extend in the respective region. For example, the images displayed by each region could change colour as the device is tilted in the relevant direction which, depending on how the regions are arranged and on the tilt direction, could give rise to the first region appearing to change to one colour whilst the second region appears to change to a different colour.

Preferably, at least one viewing position, the first and second regions both display the same colour such that the first and second regions have the same appearance and preferably cannot be distinguished from one another by the naked eye. This can be achieved for example by arranging both regions to display the same image in the same colour at one viewing angle and for instance the same image in a different colour at a different viewing angle. Thus as the device is tilted one portion of the whole image (corresponding to one of the regions) will appear to change colour whilst another region does not, thereby revealing the distinction between the regions.

In a particularly preferred example, it may be the relative arrangement of the first and second regions which defines an image which is recognisable at least one viewing angle due to contrast between the colour of the first region and the colour of the second region at that viewing angle. For instance, the images defined by the image element may be solid colour blocks and it is the boundary line between one region and the next which gives rise to discernible information on the device. This information could be hidden at one or more viewing angles (at which the colour of the two regions match). Alternatively the information could be visible at all angles but undergoes a change in contrast with its surroundings as the device is tilted. For instance, at one angle of view the information (defined by the first region) may be white and its background (defined by the second region) black, whilst at another angle of view the information (defined by the first region) may be black and its background (defined by the second region) white.

In another advantageous embodiment, the array of elongate image elements is configured such that the first region or the second region, or both, displays the appearance of a moving image as the security device is tilted about an axis parallel to the direction along which the elongate image elements extend in the respective region. In preferred examples, the images in each region could be configured to move in different (most preferably opposite) directions from one another.

A particularly preferred implementation is configured such that, when viewed at at least one viewing angle, the first and second regions together present a recognisable image to the naked eye of the viewer made up by image portions from each region (i.e. from both regions), wherein the elongate image elements define different views of the respective image portion such that as the security device is tilted about an axis parallel to either the first or second direction, the respective image portion from one of the regions appears to move laterally, while the other image portion remains stationary. This is particularly visually effective since the distinction between the two regions will be hidden at certain angles of view (preferably when the device is viewed on-axis, i.e. along its normal), yet becomes apparent when the device is tilted.

In all embodiments, the elongate image elements could be configured to carry any number of images (but at least two within each region). One image element will be provided for each image as part of each "set" of image elements, one set of image elements being provided for each focusing element in the array. Thus, where the region is configured to display two images (at different viewing angles) for example, two image elements will be provided under each focusing element (one belonging to each of the two images). The two regions need not be configured to display the same images or even the same number of different images, although this is often preferred. The images could each take any desired form but in preferred examples, each image comprises one of a letter, number, symbol, character, logo, portrait or graphic. The various images are preferably different from one another but one or more of them (i.e. a subset of the images displayed by each region) could be the same as long as at least two different images are included. Each image element will be a portion, e.g. a pixel or line of pixels, of the corresponding image. In some preferred examples, all of the images include a common image component (or "keyline") which is displayed by the region of the security device at all viewing angles. The presence of such a component, which is continuously visible as the device is tilted, assists the viewer in comparing the appearances of the device at different angles to one another, and thereby appreciating the changing visual effect. In one particularly effective implementation, the common image component is an outline surrounding a region, the contents of which region vary (e.g. in terms of colour) between the different images. Thus the keyline can act as a framing element. Alternatively the keyline could be formed as a border around an internal portion of an image, or as a section of an image.

In some preferred embodiments, the image elements are defined by inks. Thus, the image elements can be simply printed onto the substrate although it is also possible to define the image elements using a relief structure. This enables much thinner devices to be constructed which is particularly beneficial when used with security documents. Suitable relief structures can be formed by embossing or cast-curing into or onto a substrate. Of the two processes mentioned, cast-curing provides higher fidelity of replication.

A variety of different relief structures can be used as will described in more detail below. However, the image elements could be created by embossing/cast-curing the images as diffraction grating structures. Differing parts of the image could be differentiated by the use of differing pitches or different orientations of grating providing regions with a different diffractive colour. Alternative (and/or additional differentiating) image structures are anti-reflection structures such as moth-eye (see for example WO-A-2005/106601 ), zero-order diffraction structures, stepped surface relief optical structures known as Aztec structures (see for example WO-A-2005/115119 ) or simple scattering structures. For most applications, these structures could be partially or fully metallised to enhance brightness and contrast. Typically, the width of each image element position may be less than 50 microns, preferably less than 40 microns, more preferably less than 20 microns, most preferably in the range 5 -10 microns.

Any number of image strips per cell (at least 2 ) could be provided and this will depend on factors including the number of different images which it is desired to present. In theory there is no upper limit as to the number of image element positions which could be included, but, in practice, the image resolution will be reduced as the number of image element positions increases since an ever-decreasing proportion of the unit cell area (and hence of the device as a whole) will be available for display of each respective image. Also, in practical implementations the number of image element positions which can be formed in one unit cell will be limited by the resolution at which the image elements can be formed.

For example if using an ink-based printing method to form the image elements with a minimum print dimension of 15 microns then for a 30 micron wide unit cell, a maximum of 2 image strips can be provided across the width of the cell. Supposing however the minimum print dimension can be reduced to the level of around 1 micron (e.g. through the use of relief structures rather than printing to form the image elements) then the number of image elements may more likely be constrained by the desired visual effect and the size of image data file that can be managed during the origination of the print tool. The type of design effects which require a high number of matrix positions would include animation effects and more especially continuous and horizontal parallax effects. Even then, however, there is no significant benefit in having more than one image element position per degree of angular tilt since smaller angular increments cannot generally be resolved by the viewer. Since in practice devices will typically be viewed over a viewing angle range of about 30 to 35 degrees in each orthogonal axis, then a practical upper limit to the number of image element strips in each unit cell is around 30, which can be used to achieve smooth parallax effects or animation effects. However, for a 30 micron dimension focusing element and unit cell this would require the capability to form a data element with dimensions of 1 micron.

In practice however even 2 to 3 degree angular steps may be small enough to appear non-granular and therefore e.g. 9 or 11 image elements per unit cell would give a good appearance provided the data elements can be formed with circa 3 micron dimension. A further factor is that the focal spot (i.e. the portion of the image element array which is directed to the viewer by each focusing element) will in practice typically have an effective width or diameter of not less than 1.5 -2 microns for a 30 micron lens base dimension and hence image elements with a dimension less than 2 micron would not be resolvable. As such, for a 30 micron focusing element, the preferred maximum number of image strips per unit cell would be around 15,11 or 9.

Preferably, the array of image elements is located approximately in the focal plane of the focusing elements. Typical thicknesses of security devices according to the invention are 5 to 200 microns, more preferably 10 to 70 microns, with lens heights of 1 to 70 microns, more preferably 5 to 25 microns. For example, devices with thicknesses in the range 50 to 200 microns may be suitable for use in structures such as over-laminates in cards such as drivers licenses and other forms of identity document, as well as in other structures such as high security labels. Suitable maximum image element widths (related to the device thickness) are accordingly 25 to 50 microns respectively. Devices with thicknesses in the range 65 to 75 microns may be suitable for devices located across windowed and half-windowed areas of polymer banknotes for example. The corresponding maximum image element widths are accordingly circa 30 to 37 microns respectively. Devices with thicknesses of up to 35 microns may be suitable for application to documents such as paper banknotes in the form of strips, patches or security threads, and also devices applied on to polymer banknotes where both the lenses and the image elements are located on the same side of the document substrate.

If the image elements are formed as a relief structure, the relief depth depends on the method used to form the relief. Where the relief is provided by a diffractive grating the depth would typically be in the range 0.05 -1 μm and where a coarser non-diffractive relief structure is used, the relief depth is preferably in the range 0.5 to 10 μm and even more preferably 1 to 5 μm.

In preferred examples, the focusing elements are lenses or mirrors, and advantageously have spherical or apsherical focussing surfaces. The focal power could be different in different directions, e.g. to obtain an effect in which an image appears to go out of focus as the device is tilted, but preferably each focusing element has substantially equal focal power in each of the at least two orthogonal directions. In particularly preferred embodiments, the focusing elements are able to focus light in all directions and may have substantially equal focal power in all directions (i.e. each has infinite rotational symmetry), such as is the case in spherical lenses and some aspherical lenses.

The periodicity of the focusing element array and therefore maximum base dimension (footprint) of the individual focusing elements is related to the device thickness and is preferably in the range 5 -200 microns, preferably 10 - to 70 microns, most preferably 20-40 microns. This applies in both of the two dimensions. The f-number for the focusing elements is preferably in the range 0.25 to 16, more preferably 0.5 to 10. Typically the f-number will range between 0.7 and 8, more especially 1 to 4. For a plano-convex or concave lens the f-number cannot be less than 1.0. The f-number equals f/D where f is focal length and D is the base diameter of the focusing element. Since f approximates to $r/(n-1)$, where n is the refractive index (=approx. 1.45 to 15.) and r is the radius, the f-number approximates to 2 r. For a plano-convex or concave lens the f-number cannot be less than 1.0 (since the maximum value of D is 2 r. The focusing elements can be formed in various ways, but are preferably made via a process of thermal embossing or cast-cure replication. Alternatively, printed focusing elements could be employed as described in U.S. Pat. No. 6,856,462. If the focusing elements are mirrors, a reflective layer may also be applied to the focussing surface.

The focusing elements can be arranged in various different ways. In a preferred example, the grid on which the focusing elements are arranged is an orthogonal grid (square or rectangular). In other preferred implementations, the grid on which the focusing elements are arranged is a hexagonal grid (e.g. close-packed). In both cases, the elongate image elements have one-dimensional periodicity within each region.

As mentioned above, embodiments of the invention can be implemented without registering the focusing elements to the image elements. However, such registration is preferred in certain embodiments in order that the resulting visual effect can be better controlled. In particular, registration enables control over which of the various images is displayed at which viewing angles.

Preferably, the security device is formed as a security thread, strip, foil, insert, label or patch. Such devices can be applied to or incorporated into articles such as documents of value using well known techniques, including as a windowed thread, or as a strip covering an aperture in a document. Preferably, the article is selected from banknotes, cheques, passports, identity cards, certificates of authenticity, fiscal stamps and other documents for securing value or personal identity.

Alternatively, such articles can be provided with integrally formed security devices of the sort described above. Thus in preferred embodiments, the article comprises a substrate with a transparent portion, on opposite sides of which the focusing elements and elongate image elements respectively are provided.

As already described, the invention further provides a method of manufacturing a security device as set out above.

Examples of security devices will now be described and contrasted with comparative examples with reference to the accompanying drawings, in which.

Figure 5:
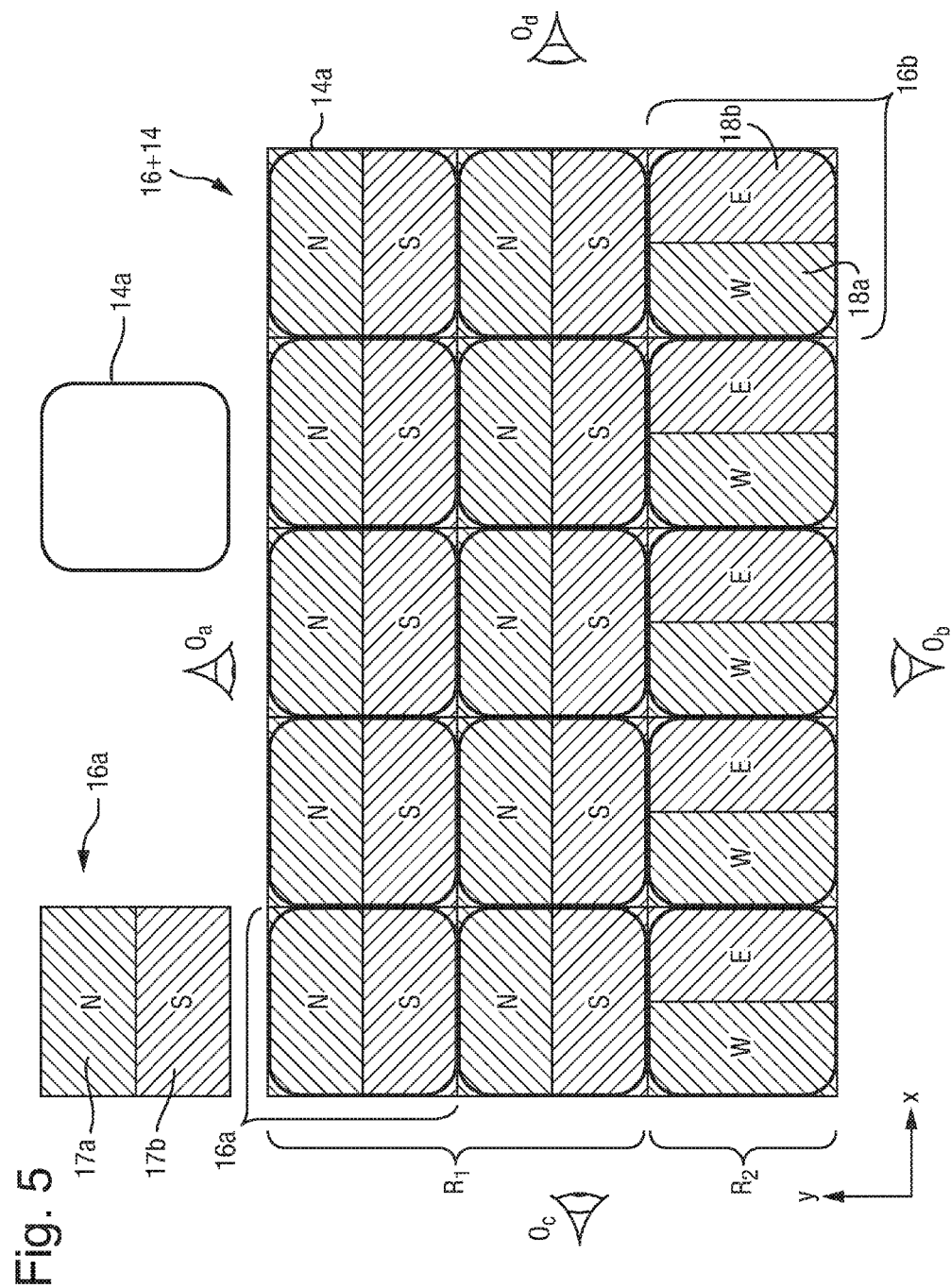
Figure 6:
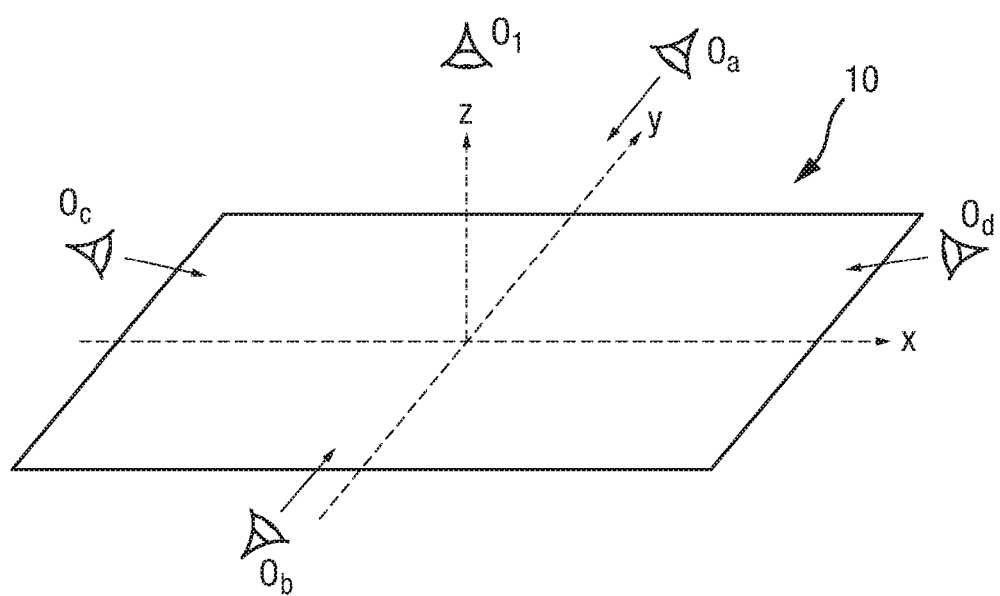
Figure 7:
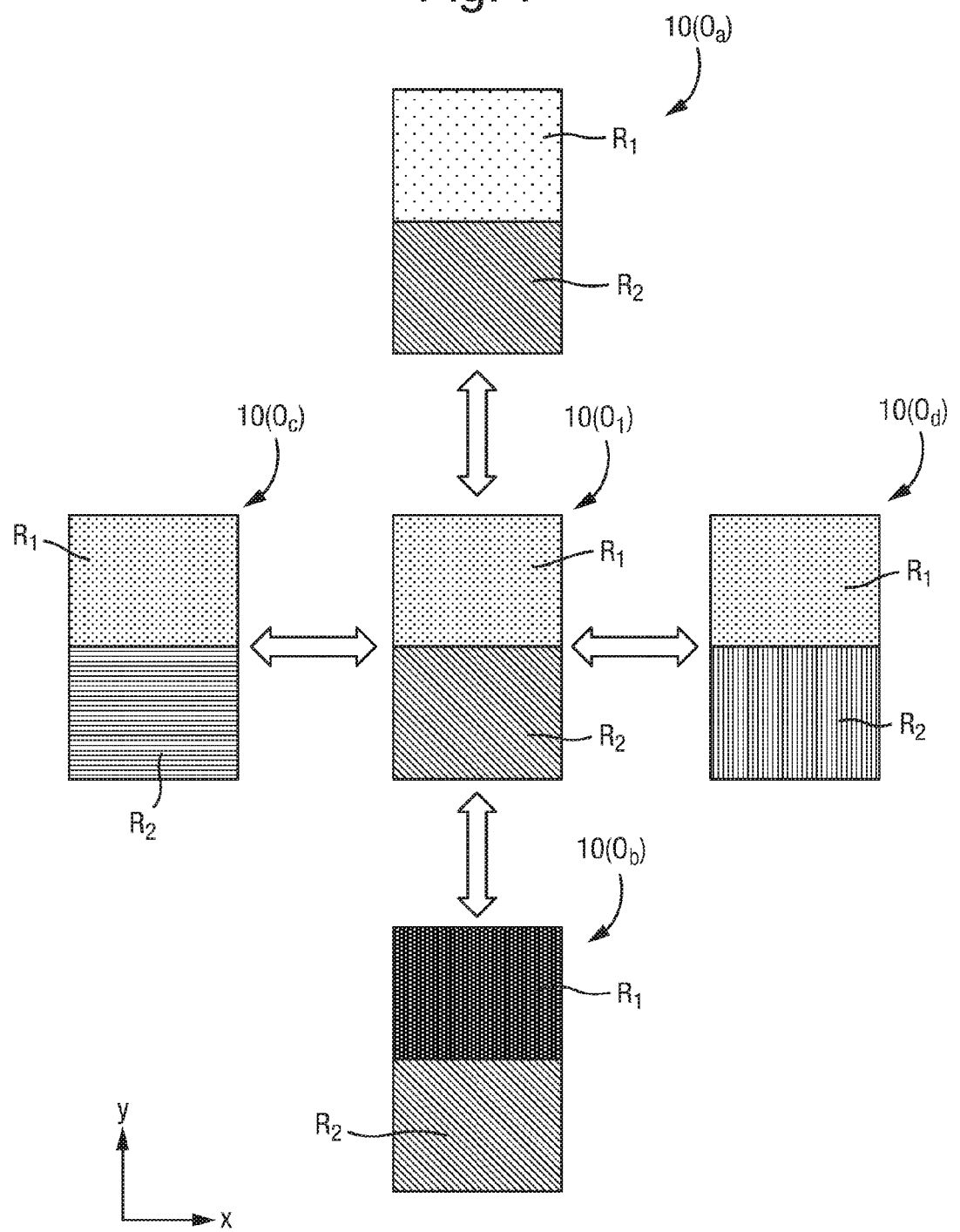
Figure 8:
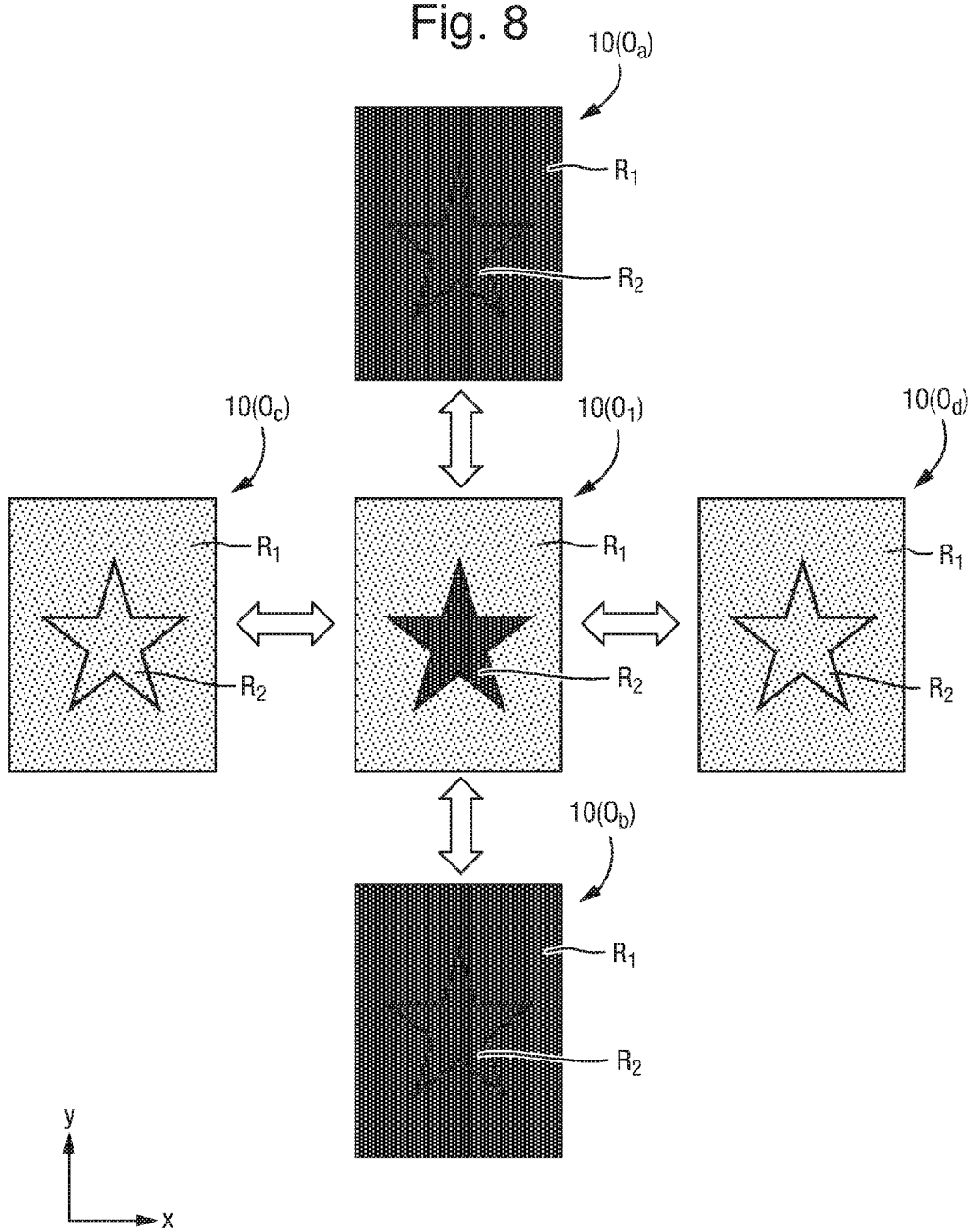
Figure 9:
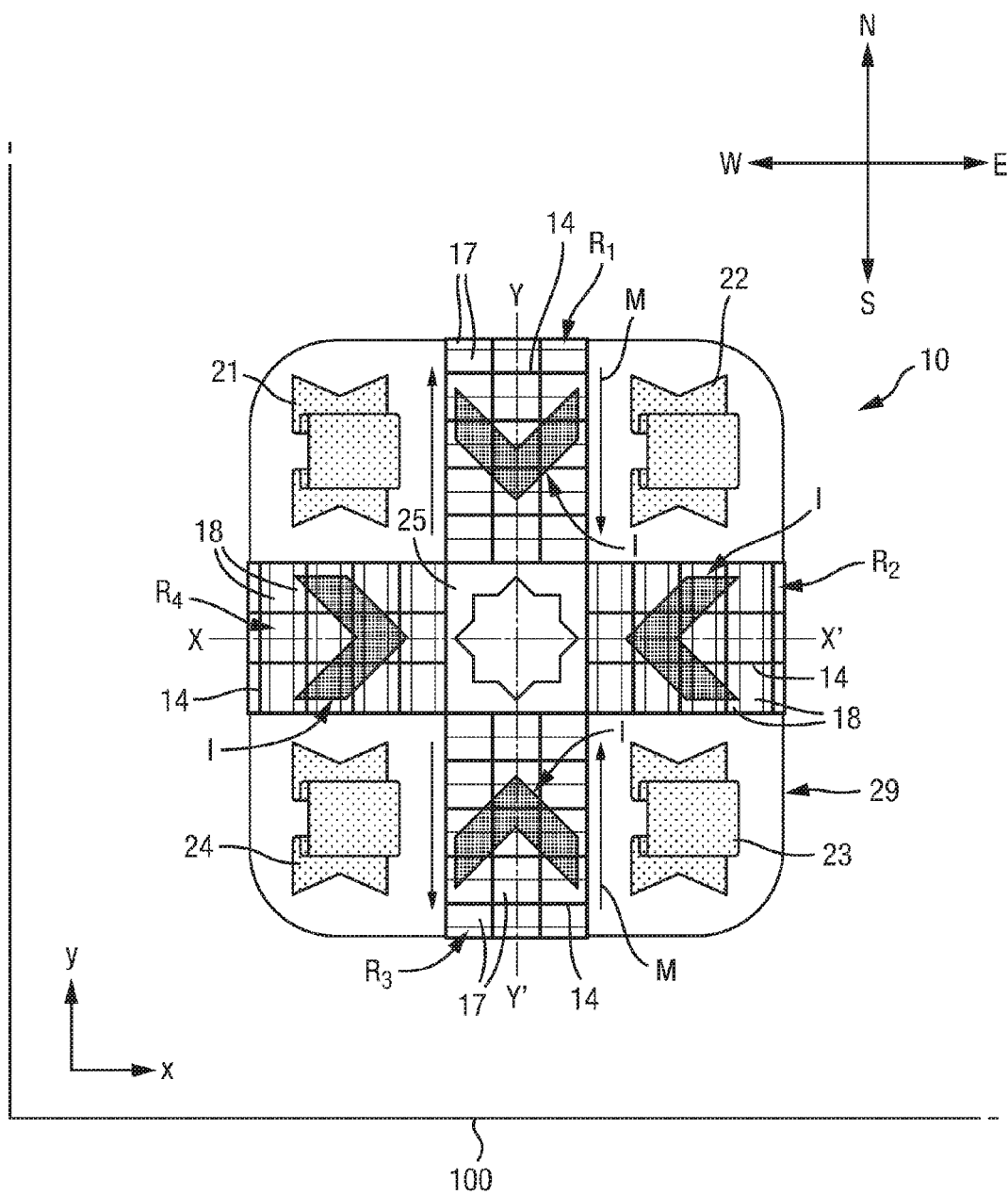
Figure 10:
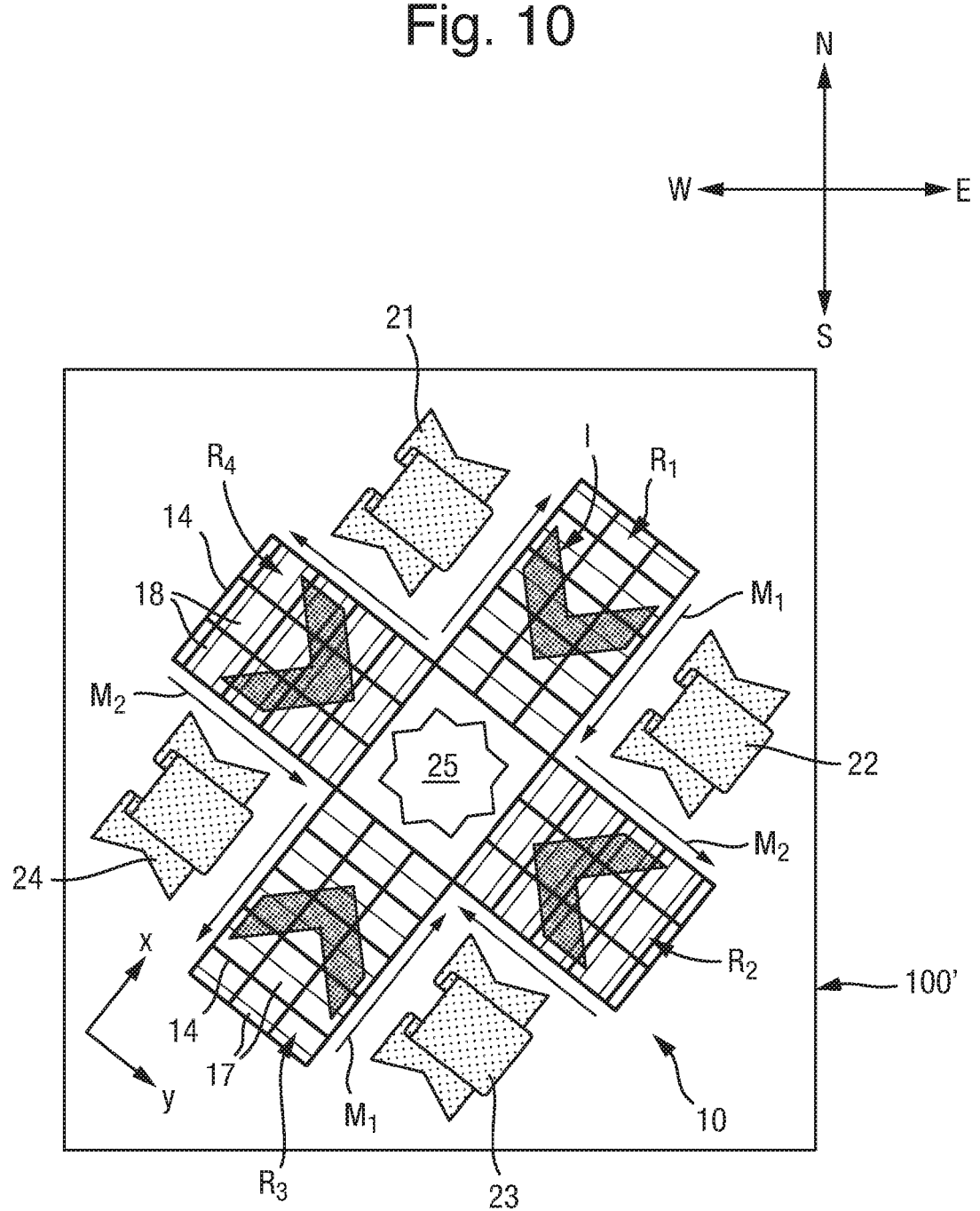
Figure 11:
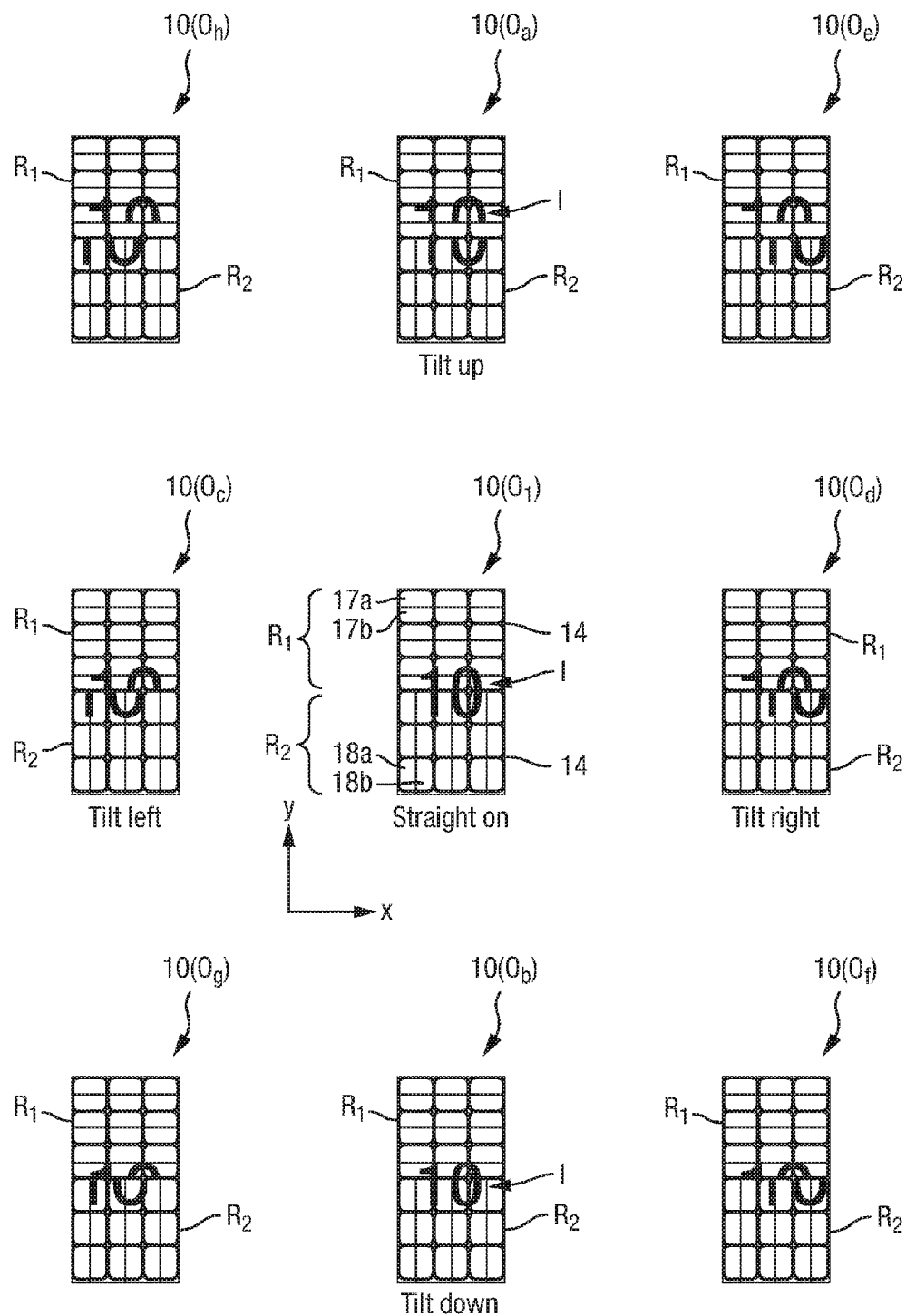
Figure 12A:
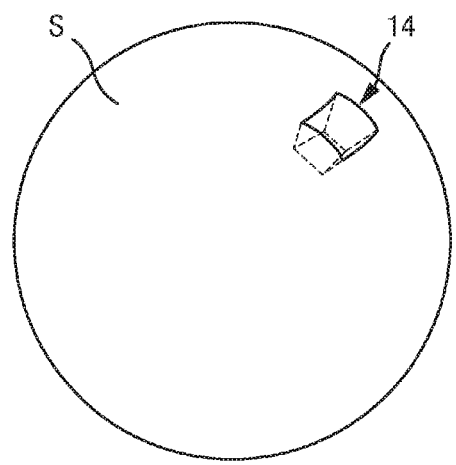
Figure 12B:
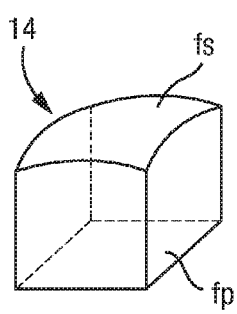
Figure 13A:
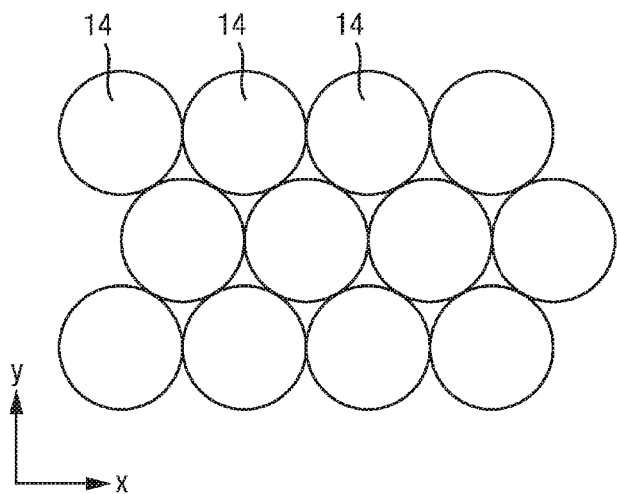
Figure 13B:
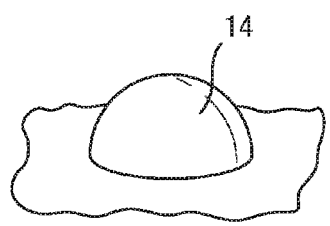

FIG. 5 schematically depicts an arrangement of focusing elements and image elements in accordance with an embodiment of the invention;

FIG. 6 shows an exemplary security device and illustrates the positions of five observers at different viewing angles;

FIGS. 7 and 8 respectively depict two security devices in accordance with embodiments of the invention, each as viewed from the positions of the five observers shown in FIG. 6;

FIG. 9 shows a further example of a security device in accordance with an embodiment of the invention, applied to a first exemplary security document;

FIG. 10 shows the security device of FIG. 9 applied to a second exemplary security document;

FIG. 11 depicts another example of a security device in accordance with an embodiment of the invention, viewed from nine different viewing positions;

FIGS. 12a and 12b schematically depict an exemplary focusing element suitable for use in embodiments of the present invention;

FIGS. 13a and 13b depict an array of focusing elements in accordance with a further embodiment of the invention, and a single focusing element, respectively;

FIGS. 14a, 14b, 14c and 14d show four exemplary unit cells on which image element arrays in accordance with embodiments of the present invention may be based;

FIGS. 15a to 15i illustrate different examples of relief structures which may be used to define image elements in accordance with the present invention;

FIGS. 16, 17 and 18 show three exemplary articles carrying security devices in accordance with embodiments of the present invention (a) in plan view, and (b) in cross-section; and FIG. 19 illustrates a further embodiment of an article carrying a security device in accordance with the present invention, (a) in front view, (b) in back view and (c) in cross-section.

Figure 1:
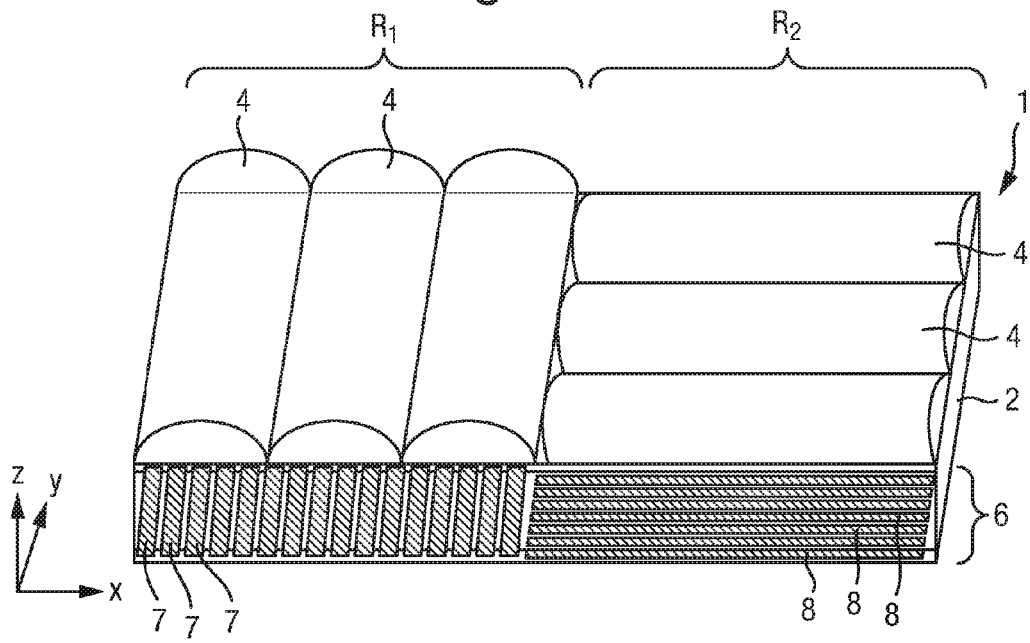
FIG. 1 is a perspective view of a comparative example of a security device.
Figure 2:
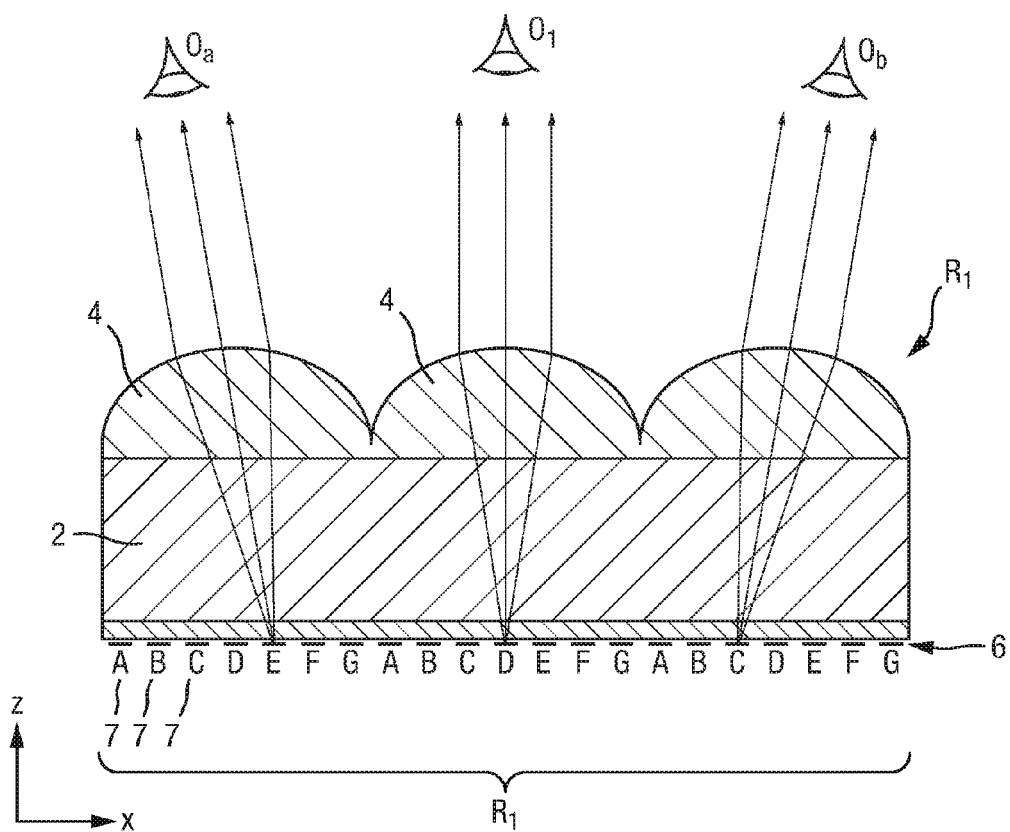
FIG. 2 is a cross-section through a portion of the security device shown in FIG. 1.

A comparative example of a lenticular device 1 in accordance with the principles described in WO-A-2011/051669 is shown in FIGS. 1 and 2 in order to illustrate certain principles of operation. FIG 1. shows the device in a perspective view and it will be seen that an array of cylindrical lenses 4 is arranged on a transparent substrate 2. An image element array is provided on the opposite side of substrate 2 underlying (and overlapping with) the cylindrical lenses. The device has two regions $R_1$ and $R_2$. In the first region $R_1$, the long dimension of the cylindrical lenses 4 and that of the image strips 7 align with a first direction, here the Y axis, whilst in the second region $R_2$, the long dimension of the cylindrical lenses 4 and that of the image strips 8 align with a second direction, here the X axis. As shown best in the X axis cross-section of FIG. 2, which shows only region $R_1$ of the device, each of the image strips corresponds to a portion of one of several images labelled A to G. A cross section through region $R_2$ along the Y axis would show the same construction.

Under each lens 4 of the lenticular array, one image strips from each of regions A to G is provided, forming a set of image strips for each lens. Under the first lens, the strips will correspond to a first segment of images A to G and under the next lens, the strips will each correspond to the second segment of images A to G and so forth. Each lens 4 is arranged to focus substantially in the plane of the image strip ⅞ such that only one strip can be viewed from one viewing position through each lens 4. As such, at any viewing angle, within each region, only the strips corresponding to one of the images (A, B, C etc.) will be seen through the lenses. For example, as depicted in FIG. 2, when the region $R_1$ of the device is viewed straight-on (i.e. parallel to the Z axis), each strip of image D will be viewed such that a composite image of image D is displayed by the region as a whole (observer $O_1$). When the device is tilted about the Y axis in a first direction, only the image strips from image E will be viewed (observer $O_a$), whereas when tilted in the opposite direction, only the image strips from image C will be viewed (observer $O_b$).

The strips are arranged as slices of an image, i.e. the strips A are all slices from one image, similarly for strips B and C etc. As a result, as the region is tilted a series of different images will be seen. The images could be related or unrelated. The simplest device would have two images within the region that would flip between each other as the device is tilted. Alternatively, the images within the region could be a series of images that have been shifted laterally strip to strip, generating a lenticular animation effect so that the image appears to move. Similarly, the change from image to image could give rise to more complex animations (e.g. parts of the image changing in a quasi-continuous fashion), morphing (one image transforms in small steps to another image) or zooming (an image gets larger or smaller in steps).

Thus, as the device is tilted about the Y axis, region $R_1$ will display a lenticular effect as described. However, the orientation of the lenses and image strips in region $R_2$ are such that the same tilting motion will not lead to any lenticular effect in region $R_2$. Similarly, when the device is tilted in the orthogonal direction (i.e. about the X axis), region $R_2$ will display a lenticular effect as the lenses direct light from different image strips to the observer, whilst now region $R_1$ will appear static. This different response from the two regions to the same tilt motion can be employed to create devices with distinctive visual effects.

However, the device shown in FIGS. 1 and 2 is complex and expensive to manufacture, due at least in part to the need to align the correct lenses 4 with the corresponding image strips ⅞. If the alignment is inaccurate (e.g. lenses aligned along the Y axis are overlapped with image strips aligned along the X axis), the desired optical effect will be diminished or at worst eliminated. Whilst this need for high registration can be beneficial in that it acts as a further barrier to counterfeiters, there is a need for a more economical device which is able to more reliably achieve the desired visual effect.

Figure 3:
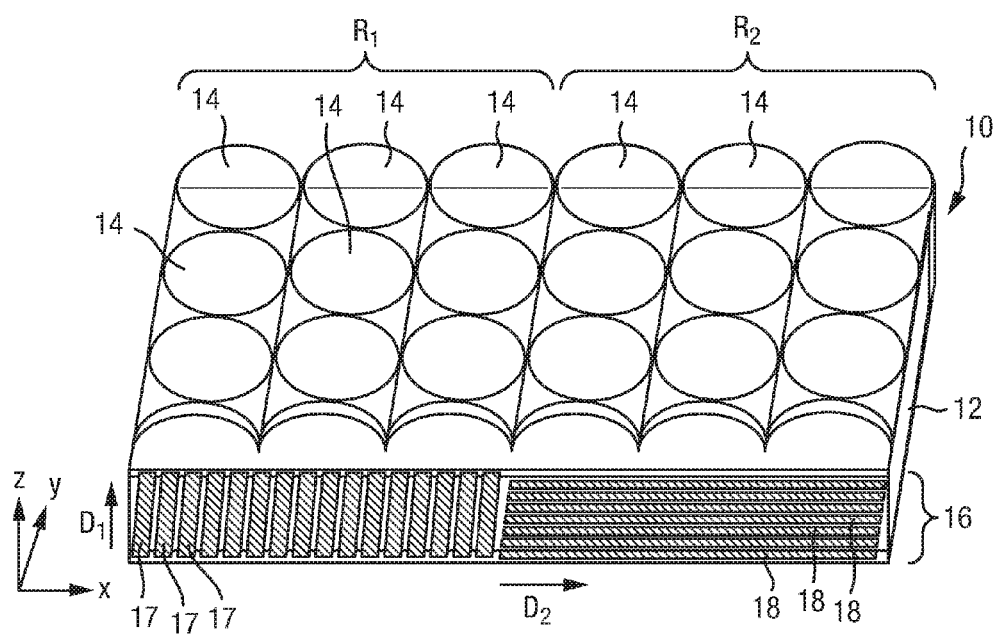
FIG. 3 is a perspective view of a security device in accordance with a first embodiment of the present invention.

FIG. 3 shows an example of a security device in accordance with a first embodiment of the present invention. Again, the device is divided into two regions $R_1$ and $R_2$, although of course any number of such regions could be included. As before, an array of focusing elements 14 is provided on one side of a transparent substrate 12, and an image element array 16 is provided on the other. However, here the focusing elements 14 take the form of (hemi-)spherical lenses arranged in a regular orthogonal grid pattern, although in other embodiments the focusing elements 14 could be mirrors. The focusing elements could also have aspherical focusing surfaces if preferred. Thus, each focusing element 14 is capable of focusing light in at least two orthogonal directions, e.g. parallel to the X axis and parallel to the Y axis. (Indeed spherical and aspherical lenses can focus light in all directions lying in the X-Y plane). The focusing elements 14 in region $R_1$ and $R_2$ are preferably of the same type, although this is not essential provided that in each region the focusing elements are capable of focusing light in two orthogonal directions as described. However, use of the same type of focusing element in both regions is preferred and preferably a continuous regular array of focusing elements of the same type will be used across both regions.

Thus, the distinction between regions $R_1$ and $R_2$ may not be apparent from the focusing element array but will be defined by the array of image elements. In the first region $R_1$ of the device, the elongate image elements 17 are aligned along a first direction $D_1$, which here is parallel to the Y axis, whilst in the second region $R_2$ the elongate image elements 18 are aligned with a second direction $D_2$, which here is parallel to the X axis. It should be noted that the first and second directions $D_1$ and $D_2$ need not be orthogonal to one another although this is preferred as will be discussed below. It should also be noted that neither directions $D_1$ nor $D_2$ need be aligned with the orthogonal directions of the grid in which focusing elements 14 are arranged, but could take any relative orientation provided that the focusing elements 14 are capable of focusing light in the direction perpendicular to the elongate direction of the underlying image elements (i.e. the directions in which the elongate image elements are periodic in each region). Where the focusing elements 14 are capable of focusing light in any direction in the X-Y plane (such as spherical and aspherical lenses), there is no limitation on the orientation of the elongate image elements relative to the lenses. This is always true for hemispherical lenses, but not for toroidal lenses for example, which have two orthogonal focal axis of planes of focus, with the result that accurate focus will only be achieved in the two orthogonal directions. In intermediate directions, the focus will become astigmatic which is highly undesirable.

Figure 4:
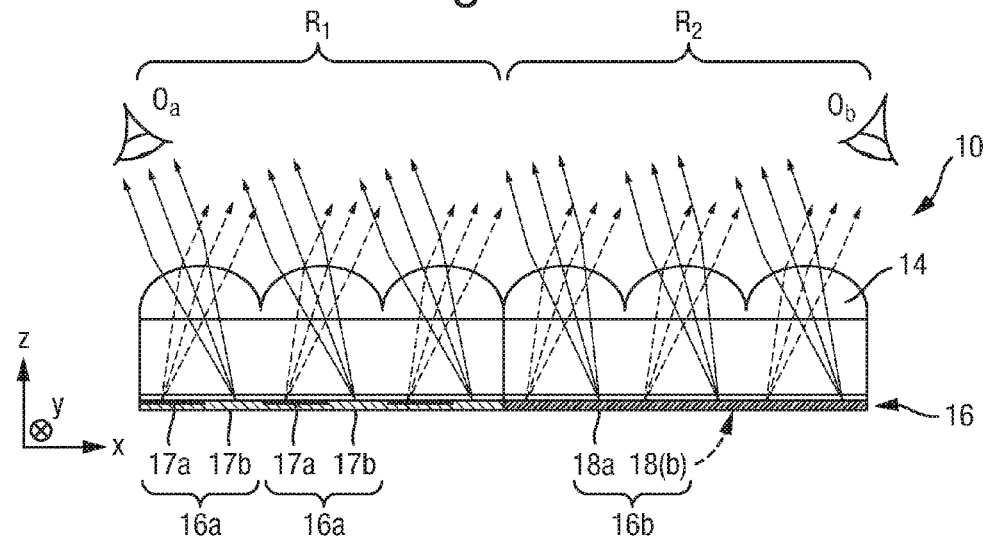
FIG. 4 is a cross-section through the device shown in FIG. 3, along the X axis.

The appearance of the device 10 at different viewing angles will be further described with reference to FIG 4. which is a cross-section through the device 10 along the X axis, although the number of image element strips 17/18 has been reduced to two per lens, 17a and 17b in region $R_1$/18a and 18b in region $R_2$, for improved clarity. Thus for each lens there is a corresponding set 16a of two elongate image elements 17a and 17b in region $R_1$/18a and 18b in region $R_2$. However, the principles of operation remain unchanged. When the device is viewed from a position of a first observer $O_a$, as indicated by the light rays shown in solid lines, in the first region $R_1$, light from image strips 17b is observed, which together make up a first image. Simultaneously, light from one set of image strips 18a in region $R_2$ of the device is also directed to the observer $O_a$, forming another image which may or may not be related to the image in region $R_1$. When the device is tilted about the Y axis to the position of second observer $O_b$, as indicated by the light rays shown in dashed lines, in region $R_1$, light from image elements 17a will now be directed to the viewer such that a different image will now be visible in this region. Meanwhile, in region $R_2$, the same image made up of image strips 18a will still be displayed to observer $O_b$, such that this region appears static.

It will be appreciated that if the device were to be tilted about the orthogonal direction (i.e. about the X axis), the appearance of region $R_1$ would remain static whilst now region $R_2$ will display a lenticular transition between the images defined by strips 18a and 18b respectively.

Thus, the two regions $R_1$ and $R_2$ produce different responses to the same tilt motion, which can be used to produce distinctive visual effects of which examples will be given below. This is achieved without the need for high registration accuracy between the focusing array 14 and the array 16 of elongate image elements, since the same type (and orientation) of focusing elements can be used in both regions of the device without need for any alignment. For example, a continuous regular array of lenses or other focusing elements can be used across the device 10 with the different regions being defined solely by the applied elongate image elements and their directions.

FIG. 5 shows an arrangement of image elements and their positions relative to a lens array in accordance with an embodiment of the invention. As in the case of FIG. 3, here the lens array 14 is an orthogonal grid of lenses, each of which has a substantially square footprint 14a. An array of five lenses (in the X axis direction) by three lenses (in the Y axis direction) is depicted. The image element array 16 is based on a repeating unit cell 16a (corresponding to a "set" of image elements for each lens) which in this example is of substantially the same shape and size of the lens footprint 14a although this is not essential. Again, an array of five unit cells 16a (in the X axis direction) by three unit cells (in the Y axis direction) is depicted.

Defined within the unit cell 16a are a number of elongate image elements (in region $R_1$) and 18 (in region $R_2$). In this example, each unit cell is divided in half to define two elongate image elements 17a, 17b (in region $R_1$) and 18a, 18b (in region $R_2$). In a first region $R_1$ of the device, the elongate direction of the image elements 17a and 17b is aligned with the X axis of the device. The image element 17a, taking up the upper portion of each unit cell 16a, carries a portion of an image N, whilst in the lower half of each unit cell, image element 17b carries a portion of another image S. In the second region $R_2$ of the device, the left hand half of each unit cell, image element 18a, carries a portion of another image W, whilst in the right hand half of each unit cell 16b, image element 18b carries a portion of a fourth image E.

Thus, when the device is tilted about the X axis from the position of observer $O_a$ to that of observer $O_b$, region $R_1$ will appear to undergo a lenticular transition from image S to image N, whilst region $R_2$ will appear unchanging. If the device is tilted instead about the Y axis from the position of observer $O_c$ to that of observer $O_d$, the first region $R_1$ of the device will now appear static whilst region $R_2$ will display a change from image E to image W. If the device is tilted about some other axis lying in the X-Y plane, both regions $R_1$ and $R_2$ will exhibit transitions between their respective images simultaneously (although the switch will not necessarily take place at the same angle of tilt).

Some examples of security devices in accordance with embodiments of the invention which utilise this principle to display distinctive visual effects will now be described. For reference, FIG. 6 shows schematically an exemplary security device 10 lying in the plane indicated and the positions of five exemplary observers $O_1$, $O_a$, $O_b$, $O_c$ and $O_d$. Observer $O_1$ represents the on-axis viewing position (i.e. the device is viewed parallel to the Z axis). Observers $O_a$ and $O_b$ represent two viewing positions between which the device has been rotated about the X axis, and likewise observers $O_c$ and $O_d$ represent two viewing positions between which the device has been rotated about the Y axis.

FIG. 7 depicts an example of a security device 10 and its appearance when viewed from each of the five positions shown in FIG. 6. The notation "10($O_1$)" denotes the appearance of the device from the position of observer $O_1$, likewise the notation "10($O_a$)" denotes the appearance of the device from the position of observer $O_a$, and so on. In the FIG. 7 example, the device 10 comprises two regions $R_1$ and $R_2$ each of which is substantially rectangular, the two regions abutting one another as shown. It will be appreciated that the two regions need not abut one another although this is preferred in order that the appearances of the two regions can be directly compared. In the first region $R_1$, the elongate image elements have their long axes aligned with the X axis of the device (as indicated in region $R_1$ in FIG. 5), whilst in region $R_2$ the elongate image elements have their long axes aligned with the Y axis (as in the case of region $R_2$ in FIG. 5). For simplicity, in FIG. 7 the different images displayed by each region at the various viewing angles are depicted as solid blocks of colour, the colour of which changes from one image to another. However, it will be appreciated that this need not be the case and in practice each image could for example show a symbol, letter, number, logo or other graphic through appropriate choice of the image elements.

When viewed on-axis from the position of observer $O_1$, the region $R_1$ appears as a first colour and the region $R_2$ appears in a different colour, each dependent on the image strips which are directed to the viewer by the focusing elements within each region. When the device is tilted about the X axis to the position of observer $O_a$, the appearance of region $R_1$ changes to a second colour (i.e. a second image), defined by a different set of image strips which are now directed to the observer, whilst the appearance of region $R_2$ is unchanged. Similarly, when the device is tilted in the opposite direction about the X axis (observer $O_b$), the colour of region $R_1$ changes to a third colour (i.e. a third image) whilst again the appearance of region $R_2$ remains substantially constant. Thus, the contrast between the two regions appears to change as tilt occurs.

When the device is tilted about the Y axis to the position of observer $O_c$, now region $R_1$ remains unchanged relative to the on-axis viewing position whilst region $R_2$ changes in appearance to a fourth colour (i.e. a fourth image). When the device is tilted in the opposite direction about the Y axis to the position of observer $O_d$, again the appearance of region $R_1$ remains unchanged whilst that of region $R_2$ changes to a fifth colour (i.e. a fifth image). Again, the contrast between the two regions will therefore be observed to change.

In this example it will be noted that each region $R_1$ and $R_2$ changes in appearance between three different colours (or images). This can be achieved either by providing (at least) three corresponding image strips in the unit cell in each region (e.g. in region $R_1$, one image strip corresponding to the light colour (first image) seen by observer $O_a$, a second image strip corresponding to the medium colour (second image) seen by observer $O_1$, and a third image strip corresponding to the dark colour (or third image) seen by observer $O_b$, for each lens). Alternatively, the colour perceived at one or more of the viewing positions may be the result of the observer receiving a mixture of light from two adjacent image elements with each set (unit cell). For example, if the image element array is as shown in FIG. 5, when viewed from the on-axis position, it will be the region of intersection between the two image elements 17a and 17b which is directed to the viewer, resulting in a mixed image combining components from both images. Where both images are solid colours, this results in an intermediate colour.

In the FIG. 7 example, the appearances of regions $R_1$ and $R_2$ are different from one another at all the viewing positions shown and preferably at all possible viewing positions. However, in other embodiments it is advantageous if the two regions share the same appearance (i.e. exhibit the same image) at one or more viewing angles. An example of such a device is shown in FIG. 8 where the appearance of the device 10 as seen by the different observers $O_1$, $O_a$ etc. is denoted as before.

In this example, the first region $R_1$ is a substantially rectangular area which abuts and surrounds the second region $R_2$ which has the shape of a star. Again, in this example, the images exhibited by each region at various angles of tilt are solid colours although this is not essential. When the device is viewed on-axis from the position of observer $O_1$, the background region $R_1$ appears in a first colour, as determined by a first image strip within each set which is directed to the viewer in this configuration, whilst the star shaped region $R_2$ appears to have a second, different colour as determined by the relevant image strip in that region. When the device is tilted about the X axis to the position of observer $O_a$, the background region $R_1$ changes colour from the first colour to the second colour whilst the appearance of star-shaped region $R_2$ does not change. This is because, as before, in the region $R_1$ the elongate image elements are aligned with the X axis whereas in the second region $R_2$, they are aligned with the Y axis. The presence of the star-shaped region $R_2$ is thus concealed and the star symbol appears to disappear. It should be noted that the star-shaped outline illustrated in FIG. 8 for clarity may or may not be visible in practice.

Similarly, in this embodiment when the device is tilted about the X axis from the position of observer $O_1$ to that of observer $O_b$, again the colour of region $R_1$ appears to change to match that of the star shaped region $R_2$ such that once again the presence of the star-shaped symbol is concealed. This sequence of transitions can be provided for example by arranging at least three elongate image elements in the set corresponding to each focusing element in region $R_1$, of which the centremost displays the light background colour seen by observer $O_1$ whilst the two outer elements each display the darker colour seen by observer $O_a$ and $O_b$.

Returning to the on-axis viewing position, when the device is tilted about the Y axis to the position of observer $O_c$, now the appearance of background region $R_1$ is unchanging whilst that of the star-shaped region $R_2$ changes from the second colour seen from the on-axis viewing position to the first colour, i.e. matching that of the background region $R_1$. Thus, again the presence of star-shaped region $R_2$ is concealed. Similarly, when the device is tilted in the opposite direction about the Y axis to the position of observer $O_d$ the same change takes place. Again, this sequence of transitions can be provided by arranging at least three elongate image elements of the appropriate colours in each set in the region $R_2$.

It will be appreciated that in the embodiment of FIG. 8, the shapes of regions $R_1$ and $R_2$ cooperate to define an item of information, here the star-shaped symbol, which becomes more or less visible at different angles of viewing. It is preferred that the colours of the two regions match at least one angle of view, so as to conceal the presence of the information item, although this is not essential and the two regions could consistently present a contrast (which changes at different angles of view), as in the FIG. 7 embodiment. Further, in the example shown, the item of information is visible in the on-axis position and disappears when the device is tilted, but in other examples the opposite arrangement may be preferred, i.e. where the item of information is concealed in the on-axis viewing position (the colours of the two regions matching in this orientation) and is revealed upon tilting.

FIG. 9 shows a further embodiment of a security device applied to a exemplary security document 100 of which only one corner is depicted in the Figure. The security device 10 here takes the form of a label or patch which is applied to the surface of the security document 100 although other incorporation techniques are possible and will be described below. The axes X and Y define the frame of reference of the security device 10 whilst the orthogonal directions denoted as N, E, S, W define the primary tilt directions of the document 100 as described below.

In this example, the security device 10 comprises four regions $R_1$, $R_2$, $R_3$ and $R_4$ which are spaced from each other to form a cross-shape around the centre of the device 10, with the four regions only touching one another at their inner corners. Each region of the device carries an array of focusing elements 14 which, as in previous embodiments, is arranged according to an orthogonal grid aligned with the X and Y axis. Again, the individual focusing elements 14 could be spherical or aspherical lenses for example. In regions $R_1$ and $R_3$, the respective elongate image elements underlying the lens array are aligned along the X axis (it should be noted that, whilst in FIG. 9 only two image elements 17 per lens element 14 are depicted, in practice there will typically be more than this). In this example, each series of image elements which is directed to the viewer at any one particular viewing angle combine to exhibit an image I, which here takes the form of a chevron symbol. The different images formed by the various series of image strips depict the same chevron symbol at different locations in the Y axis direction along the regions $R_1$ and $R_3$. Thus, as the document 100 is tilted in the N-S direction (i.e. the device 10 is tilted about the X axis), in regions $R_1$ and $R_3$ different sets of the elongate image elements 17 become visible and the chevron appears to move towards or away from the centre of the device 10 along the Y axis as indicated by the arrows M. Preferably, the image strips are configured such that the chevron image in each of regions $R_1$ and $R_3$ moves in mutually opposite directions, i.e. both chevrons move towards the centre of the device 10 simultaneously, and away from the centre of device 10 simultaneously.

In the regions $R_2$ and $R_4$, meanwhile, the elongate image elements 18 are arranged parallel to the Y axis and again combine to present an image of a chevron I, in each case. Thus, as the device undergoes the above-described tilting action about the X axis, the regions $R_2$ and $R_4$ do not exhibit any lenticular movement effect.

When the document 100 is tilted in the W-E direction (i.e. the device 10 is tilted about the Y axis) the reverse is true. Now, the regions $R_1$ and $R_3$ appear static whilst regions $R_2$ and $R_4$ exhibit the lenticular motion effect. Again, it is preferred that the animation is designed such that the chevron images I, in the regions $R_2$ and $R_4$ move in mutually opposite directions upon tilting such that the two chevrons appear to move either towards the centre of the device 10 or away from the centre of device 10, simultaneously. It will be appreciated that the animation effect can take place in any direction since it is purely dependent on the art work.

In the FIG. 9 example, the device 10 is further provided with holographic generating structures 21, 22, 23, 24 and 25 which can for example take form of holograms or DOVID image elements. In the label construction shown, the holographic and lenticular devices are in separate areas, however it should be understood that this example is purely illustrative and for example the holographic generating structures 21, 22, 23, 24 and 25 could be located in a central band or strip and the lenticular regions $R_1$, $R_2$, $R_3$ and $R_4$ could be located on either side. Alternatively, the image provided by the lenticular device and the image provided by the holographic generating structure could be integrated into a single image by each providing components of a single image.

Arrangements such as that depicted in FIG. 9 in which the lenticular effect will only be observed in selected regions when the document is tilted in the N-S direction and only in other regions when tilted in the orthogonal W-E direction have advantages, since the intended effect is easily describable and thus a person handling the document can be certain as to whether the intended secure effect is being demonstrated. However, in other preferred embodiments, in at least one of the regions of the device it may be advantageous to arrange the elongate axis of the image elements in a direction which does not align with the N-S or W-E axis of the security document. In this case, that region will exhibit a lenticular effect when the device is tilted in either of those directions. For instance, in a particularly preferred example one or more of the regions may have their elongate image elements aligned at 45 degrees to the N-S and W-E directions. Since security documents tend to be tilted only north-south or east-west, the region can then appear to move with all tilts.

An example of such a device is illustrated in FIG. 10 where the device has the same construction as in FIG. 9 but is rotated relative to the security document 100'. On tilting the device 10 in the N-S direction or in the W-E direction, all four regions $R_1$, $R_2$, $R_3$ and $R_4$ will exhibit a lenticular movement effect of the chevron. Again, it is preferred that the image elements are configured such that all four chevrons appear to move towards the centre of the device simultaneously.

In yet further embodiments it may be advantageous to provide two regions in which the respective sets of elongate image elements are not at 90 degrees to each other but at some other (non-zero) angle. For example, the two devices shown in FIGS. 9 and 10 could be combined into a single device having eight lenticular regions arranged about the central holographic element 24, with neighbouring regions making a 45 degree angle to one another. When the device is tilted about either the N-S or W-E document directions, the device regions originally shown in FIG. 9 will display the same effects as previously described, with one pair of regions exhibiting motion and the other remaining static, whilst all four of the regions taken from FIG. 10 will display motion (although this motion may have a different apparent speed from that in the regions aligned with the tilt direction). Of course, regions having their elongate image elements arranged in any other direction (e.g. 30 degrees separation, 60 degrees etc.) could be used to obtain different effects. Preferably at least a pair of regions with orthogonal elongate image elements will be included, but this is not essential.

Another example in which regions having image elements aligned along non-orthogonal directions may be desirable is where one region forms a boundary between two other regions, or a perimeter around one region. In such cases it may be desirable for the image elements in the region forming the boundary or perimeter to lie at an angle which is non-orthogonal with the image elements in the region(s) on either side. In this case, the boundary or perimeter region will exhibit a lenticular effect whichever of the two orthogonal directions required seeing the main effect the device is tilted in. The same applies to a framing element which may not be immediately adjacent the other region(s). For instance, in the FIG. 9 embodiment, the edge of the device 10 could be provided with a thin border region 29 along which focusing elements and corresponding elongate image elements are arranged to form another active lenticular region (not shown in the Figure). Here, the image elements may be aligned at a non-zero angle with the x and y axes (e.g. 45 degrees) in which case the lenticular effect will be displayed when the device is tilted in the N-S and W-E directions. The image elements could be configured to exhibit a colour switch of the border region as the device is tilted for example.

FIG. 11 illustrates another example of a security device 10 in accordance with an embodiment of the invention and in this case its appearance from nine different viewing positions is illustrated. As before, the notation "$10(O_1)$" denotes the appearance of device 10 from the position of observer $O_1$ with reference to the observer positions shown in FIG. 6 above. It will be noted that FIG. 11 includes appearances that are seen by observers $O_{e-1}$, $O_{f-1}$, $O_g$ and $O_{h-1}$, which are not depicted in FIG. 6. However, as will be apparent, these represent intermediate observation positions between observers $O_a$ and $O_d$, $O_d$ and $O_b$ etc.

In this example, the device 10 comprises two regions $R_1$ and $R_2$ abutting one another in a manner similar to that shown in FIG. 7. An array of 2-Dimensional focusing elements 14 extends across both regions of the device and as in previous embodiments this may take the form for example of an array of spherical or aspherical lenses or mirrors. In the first region $R_1$, the elongate image elements 17a and 17b are aligned with the X axis whilst in the second region $R_2$, the elongate image elements 18a and 18b are aligned with the Y axis. Again, for the sake of clarity, the Figure illustrates only two image strips 17a and 17b for each lens element but in practice more may be provided. The image strips in region $R_1$ under the lenses 14 define an upper half portion of an image I which here represents a numeral "10", whilst the image strips 18a and 18b define a lower half portion of the same image. Thus, when the device is viewed on-axis from the position of observer $O_1$, the image displayed by region $R_1$ and the image displayed by region $R_2$ together form the numeral "10". When the device is tilted about the X axis to the position of observer $O_{a-1}$, the region $R_1$ exhibits a lenticular effect which in this case appears to show the top half of the image I (i.e. the top half of the number "10") having moved towards the top of the device, leaving a gap between it and the bottom half of the image in region $R_2$, which remains static. This is achieved by using the elongate image elements 17a and 17b to define images of the same portion of the number 10 but at different locations along the Y axis of the device. Similarly, if the device is tilted in the opposite direction about the X axis to the position of observer $O_b$, the first region $R_1$ exhibits a lenticular effect in which the top half of the numeral 10 appears to be shifted downwards thereby giving the overall impression of a compressed digit "10", whilst again region $R_2$ is unchanged.

Returning to the on-axis viewing position at observer $O_1$, when the device is tilted about the Y axis to the position of observer $O_c$ or $O_d$, now the first region $R_1$ remains static whilst the image displayed in region $R_2$ appears to move to the left or to the right, giving the impression of sliding the two halves of the numeral relative to one another.

FIG. 11 also illustrates the effect of tilting about both axes simultaneously as will be observed by observers $O_e$, $O_f$, $O_g$ and $O_h$.

It will readily be seen from FIG. 11 that it is easy to determine the presence of the security effect by simply tilting the device and observing that what appears to a symbol "10" when viewed on-axis is then broken up in a simple, predetermined manner. In the example shown in FIG. 11, the symbol "10" is complete when the device is used perpendicularly. However, the registration between the images and lenses can be adjusted such that the symbol "10" is visible at a different viewing condition, when the device is tilted.

In general, registration between the lenses 14 and the image strips 16 is desirable since this enables control over which images are displayed at which viewing angles, as is utilised for example in the FIG. 11 embodiment. However, registration is not essential and could be dispensed with in any of the embodiments.

As previously mentioned, in preferred examples the individual focusing elements may have spherical or aspherical focusing surfaces. However, this does not require the footprint of each focusing element to be circular, as illustrated in FIG. 12. FIG. 12a shows, for the sake of illustration, a spherical surface S and a three-dimensional segment of that surface labelled 14. This is shown in isolation in FIG. 12b where it will be seen that the portion of the spherical surface forms the focusing surface fs of the lens element whilst the underlying footprint fp can be square or rectangular, according to the dimensions of the segment. Forming the focusing elements in this way enables the array to be closely packed, without significant gaps between each focusing element, on an orthogonal grid.

However, in other cases focusing elements having circular (or oval) footprints may be used and an example of such an embodiment is shown in FIG. 13. Here, FIG. 13b depicts an individual focusing element 14 which is hemispherical. Such elements could be arranged on an orthogonal grid as shown in FIG. 3 but due to the gaps this will leave between elements, it may be preferred to arrange such elements in a hexagonal close packed grid as shown in FIG. 13a. The elongate image elements can still be arranged as described in any of the preceding embodiments.

Figure 14A:
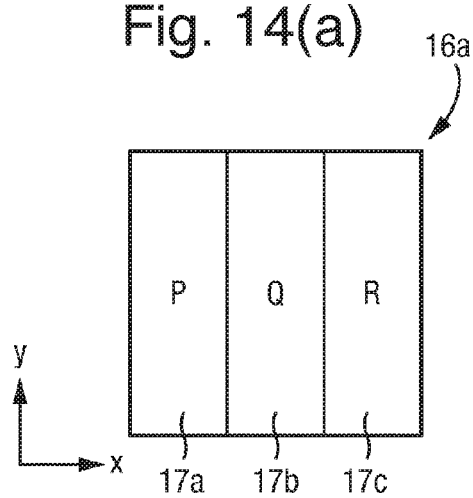

As mentioned above, whilst for clarity's sake most of the Figures depict the provision of two elongate image elements per lens, in practice, many more image strips may be provided in order to exhibit a greater number of different images at different tilt angles. FIG. 14 shows some further examples of unit cells 16a of the image element array 16 which could be used in any of the regions of the device. In FIG. 14a, the unit cell 16a includes three elongate image elements 17a, 17b and 17c each with their long axis aligned with the Y axis of the device. The image element 17a carries portions of an image P, whilst the image element 17b carries portions of an image Q and the image element 17c carries portions of an image R. Assuming the corresponding lens element is centred on the unit cell 16a, when the device is viewed on-axis, the element 17b will be visible such that the image Q is exhibited, whilst when the device is tilted about the Y axis the displayed image will switch to image P in one direction and to image R in the other. When the device is tilted about the X axis, regions of the device having this unit cell will exhibit no change.

Figure 14B:
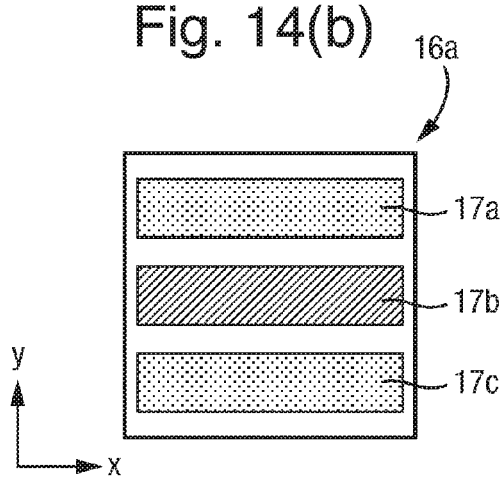

As illustrated in FIG. 14a, it is generally preferable for the image elements to abut one another, but this is not essential and FIG. 14b shows an example of a unit cell 16a in which this is not the case. Here, three image elements 17a, 17b and 17c are provided alongside one another but not in contact, the long axis of each element being aligned with the X axis. Here, each image element is of a single solid colour such that the corresponding region of the device appears to change between colours as tilted about the Y axis (akin to the changes displayed by region $R_1$ in the FIG. 8 embodiment).

Figure 14C:
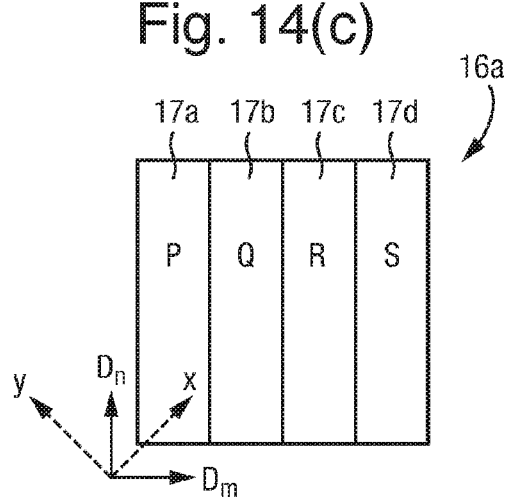

In the majority of the previous embodiments, the elongate image elements are aligned with the X or Y axes of the device and in particular with the grid arrangement of focusing elements. However, this is not essential and the image strips could be aligned along any direction provided that the focusing elements are capable of focusing light in the perpendicular direction. This will automatically be the case where the focusing elements are spherical or aspherical lenses, for example. Thus, FIG. 14c shows an example of a unit cell 16a of an image element array whose axes $D_m$ and $D_n$ are not aligned with the device axis X and Y. In this case, when the device is tilted about the X axis or the Y axis, the region depicted will always exhibit a lenticular effect whereas this will be inhibited when the device is tilted along the different direction $D_n$.

Figure 14D:
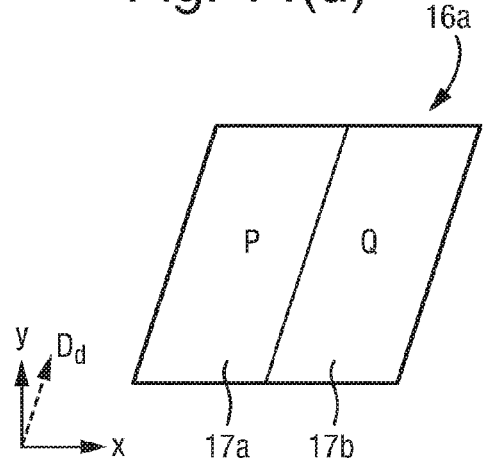

Finally, it should also be appreciated that the image element array need not be based on an orthogonal arrangement but the unit cells could for example take a non-orthogonal shape such as the parallelogram or rhombus depicted in FIG. 14d, in which case within one region, the tilt directions about which the two extremes of behaviour are observed (i.e. strong lenticular effect vs no lenticular effect)

may be spaced by some angle other than 90°. For instance, in the example depicted in FIG. 14*d*, the two elongate image elements are aligned along direction $D_d$ and the device will exhibit a lenticular effect when tilted about each of the X and Y axes but not when tilted along the direction $D_d$.

It should be appreciated that whilst many of the embodiments described above refer only to first and second device regions, in practice any plural number of regions could be provided, depending on the complexity of the desired device. Each region could have its elongate image elements arranged along a different (non-parallel) direction from each of the other regions. However in many cases a subset of regions may have their elongate image elements arranged in the same direction (i.e. parallel to one another), so that they are responsive to the same tilt direction. This may be appropriate for instance in the case where a series of letters/numbers or a complex logo or other graphic is to be defined by the contrast between the regions in the manner of the FIG. 8 embodiment, more than one region being used to form the item of information. Also in embodiments where each region displays an image rather than a solid colour, such as the FIG. 11 embodiment, more than two regions may be used, e.g. such that the image "10 " shown in FIG. 11 appears to break up into more than two sections upon tilting.

Figure 15:
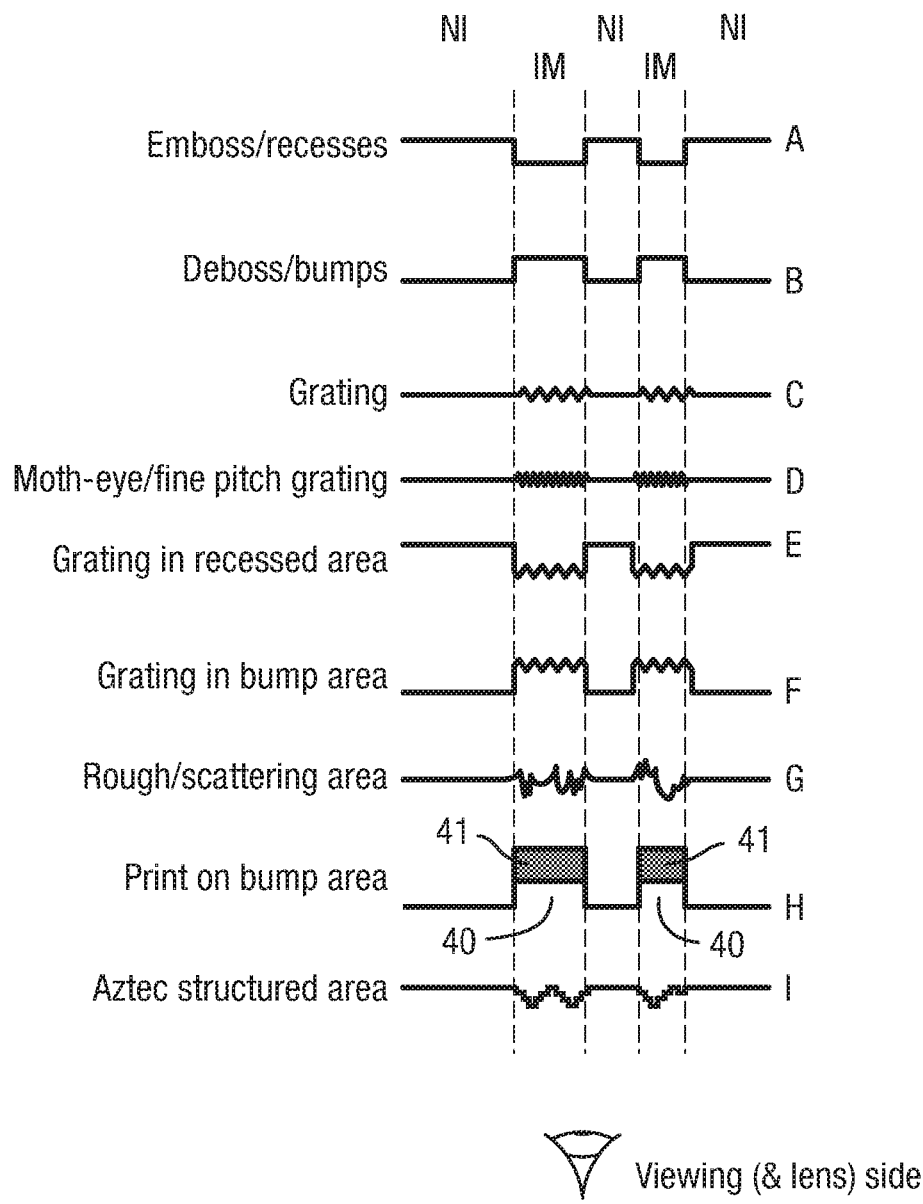

In all of the above examples, the image elements (strips) could be formed in various different ways. For example, the image elements could be formed of ink, for example printed onto the substrate 12 or onto an underlying layer which is then positioned adjacent to the substrate 12. However, in other examples the image elements can be formed by a relief structure and a variety of different relief structure suitable for this are shown in FIG. 15. Thus, FIG. 15*a* illustrates image regions of the image elements (IM), e.g. the shaded regions of image elements 17 and 18 which form the chevron images I shown in FIG. 9, in the form of embossed or recessed regions while the non-embossed portions correspond to the non-imaged regions of the elements (NI). FIG. 15*b* illustrates image regions of the elements in the form of debossed lines or bumps.

In another approach, the relief structures can be in the form of diffraction gratings (FIG. 15*c*) or moth eye/fine pitch gratings (FIG. 15*d*). Where the image elements are formed by diffraction gratings, then different image portions of an image (within one image element or in different elements) can be formed by gratings with different characteristics. The difference may be in the pitch of the grating or rotation. This can be used to achieve a multi-colour diffractive image which will also exhibit a lenticular optical effect such as an animation through the mechanism described above. For example, if the image elements creating the chevron images I of FIG. 9 had been created by writing different diffraction tracks for each element, then as the device in FIG. 9 is tilted, lenticular transition from one image to another will occur as described above, during which the colour of the images will progressively change due to the different diffraction gratings. Different diffraction gratings could also be used to produce the different colour areas described above in relation to FIGS. 7 and 8. A preferred method for writing such a grating would be to use electron beam writing techniques or dot matrix techniques.

Such diffraction gratings for moth eye/fine pitch gratings can also be located on recesses or bumps such as those of FIGS. 15*a* and 15*b*, as shown in FIGS. 15*e* and *f* respectively.

FIG. 15*g* illustrates the use of a simple scattering structure providing an achromatic effect.

Further, in some cases the recesses of FIG. 15*a* could be provided with an ink or the debossed regions or bumps in FIG. 15*b* could be provided with an ink. The latter is shown in FIG. 15*h* where ink layers 100 are provided on bumps 110. Thus the image areas of each image element could be created by forming appropriate raised regions or bumps in a resin layer provided on a transparent substrate such as item 12 shown in FIG. 3. This could be achieved for example by cast curing or embossing. A coloured ink is then transferred onto the raised regions typically using a lithographic, flexographic or gravure process. In some examples, some image elements could be printed with one colour and other image elements could be printed with a second colour. In this manner when the device is tilted to create the lenticular animation effect described above, the images will also be seen to change colour as the observer moves from one view to another. In another example all of the image elements in one region of the device could be provided in one colour and then all in a different colour in another region of the device.

Finally, FIG. 15*i* illustrates the use of an Aztec structure.

Additionally, image and non-image areas could be defined by combination of different element types, e.g. the image areas could be formed from moth eye structures whilst the non-image areas could be formed from gratings. Alternatively, the image and non-image areas could even be formed by gratings of different pitch or orientation.

Where the image elements are formed solely of grating or moth-eye type structures, the relief depth will typically be in the range 0.05 microns to 0.5 microns. For structures such as those shown in FIGS. 15*a, b, e, f, h* and *i*, the height or depth of the bumps/recesses is preferably in the range 0.5 to 10 µm and more preferably in the range of 1 to 2 µm. The typical width of the bumps or recesses will be defined by the nature of the artwork but will typically be less than 100 µm, more preferably less than 50 µm and even more preferably less than 25 µm. The size of the image elements and therefore the size of the bumps or recesses will be dependent on factors including the type of optical effect required, the size of the focusing elements and the desired device thickness. For example if the diameter of the focusing elements is 30 µm then each image element may be around 15 µm wide or less. Alternatively for a smooth animation effect it is preferable to have as many views as possible, typically at least three but ideally as many as thirty. In this case the size of the elements (and associated bumps or recesses) should be in the range 0.1 to 6 µm. In theory, there is no limit as to the number of image elements which can be included but in practice as the number increases, the resolution of the displayed images will decrease, since an ever decreasing proportion of the devices surface area is available for the display of each image.

In practice, however the image elements are formed, the width of the image elements is directly influenced by two factors, namely the pitch of the focusing element (e.g. lens) array and the number of image elements required within each lens pitch or lens base width. The former however is also indirectly determined by the thickness of the lenticular device. This is because the focal length for a plano-convex lens array (assuming the convex part of the lens is bounded by air and not a varnish) is approximated by the expression $r/(n-1)$, where r is the radius of curvature and n the refractive index of the lens resin. Since the latter has a value typically between 1.45 and 1.5 then we may say the lens focal approximates to 2 r. Now for a close packed lens array, the base diameter of the lens is only slightly smaller than the lens pitch, and since the maximum value the base diameter can have is 2r, it then follows that the maximum value for the lens pitch is close to the value 2 r which closely approximates to the lens focal length and therefore the device thickness.

To give an example, for a security thread component as may be incorporated into a banknote, the thickness of the lenticular structure and therefore the lens focal length is desirably less than 35 µm. Let us suppose we target a thickness and hence a focal length of 30 µm. The maximum base diameter we can have is from the previous discussion equal to 2 r which closely approximates to the lens focal length of 30 µm. In this scenario the f-number, which equals (focal length/lens base diameter), is very close to 1. The lens pitch can be chosen to have a value only a few µm greater than the lens diameter—let us choose a value of 32 µm for the lens pitch. It therefore follows for a two channel lenticular device (i.e. two image element strips per unit cell) we need to fit two image strips into 32 µm and therefore each strip is 16 µm wide. Such a strip or line width is already well below the resolution of conventional web-based printing techniques such as flexo-graphic, lithographic (wet, waterless & UV) or gravure, which even within the security printing industry have proven print resolutions down to the 50 to 35 µm level at best. Similarly for a four channel lenticular the problem of print resolution becomes more severe as the printed line width requirement drops down to 8 µm (in this example), and so on.

As a result, for ink based printing of the image elements, the f-number of the lens should preferably be minimised, in order to maximise the lens base diameter for a given structure thickness. For example suppose we choose a higher f-number of 3, consequently the lens base diameter will be 30/3 or 10 µm. Such a lens will be at the boundary of diffractive and refractive physics–however, even if we still consider it to be primarily a diffractive device then the we may assume a lens pitch of say 12 µm. Consider once again the case of a two channel device, now we will need to print an image strip of only 6 µm and for a four channel device a strip width of only 3 µm. Conventional printing techniques will generally not be adequate to achieve such high resolution. However, suitable methods for forming the image elements include those described in WO-A-2008/000350, WO-A-2011/102800 and EP-A-2460667.

This is also where using a diffractive structure to provide the image strips provides a major resolution advantage: although ink-based printing is generally preferred for reflective contrast and light source invariance, techniques such as modern e-beam lithography can be used generate to originate diffractive image strips down to widths of 1 µm or less and such ultra-high resolution structures can be efficiently replicated using UV cast cure techniques.

As mentioned above, the thickness of the device 10 is directly related to the size of the focusing elements and so the optical geometry must be taken into account when selecting the thickness of the transparent layer 12. In preferred examples the device thickness is in the range 5 to 200 microns. "Thick" devices at the upper end of this range are suitable for incorporation into documents such as identification cards and drivers licences, as well as into labels and similar. For documents such as banknotes, thinner devices are desired as mentioned above. At the lower end of the range, the limit is set by diffraction effects that arise as the focusing element diameter reduces: e.g. lenses of less than 10 micron base diameter (hence focal length approximately 10 microns) and more especially less than 5 microns (focal length approximately 5 microns) will tend to suffer from such effects. Therefore the limiting thickness of such structures is believed to lie between about 5 and 10 microns.

In the case of relief structures forming the image elements, these will preferably be embossed or cast cured into a suitable resin layer on the opposite side of the substrate 12 to the lens array 14. The lens array 14 itself can also be made using cast cure or embossing processes, or could be printed using suitable transparent substances as described in U.S. Pat. No. 6,856,462. The periodicity and therefore maximum base diameter of the lenticular focusing elements is preferably in the range 5 to 200 µm, more preferably 10 to 60 µm and even more preferably 20 to 40 µm. The f number for the lenticular focusing elements is preferably in the range 0.1 to 16 and more preferably 0.5 to 4.

Whilst in the above embodiments, the focusing elements have taken the form of lenses, in all cases these could be substituted by an array of focusing mirror elements. Suitable mirrors could be formed for example by applying a reflective layer such as a suitable metal to the cast-cured or embossed lens relief structure. In embodiments making use of mirrors, the image element array should be semi-transparent, e.g. having a sufficiently low fill factor to allow light to reach the mirrors and then reflect back through the gaps between the image elements. For example, the fill factor would need to be less than $1/\sqrt{2}$ in order that that at least 50 % of the incident light is reflected back to the observer on two passes through the image element array.

Security devices of the sort described above can be incorporated into or applied to any article for which an authenticity check is desirable. In particular, such devices may be applied to or incorporated into documents of value such as banknotes, passports, driving licences, cheques, identification cards etc.

The security device or article can be arranged either wholly on the surface of the base substrate of the security document, as in the case of a stripe or patch, or can be visible only partly on the surface of the document substrate, e.g. in the form of a windowed security thread. Security threads are now present in many of the world's currencies as well as vouchers, passports, travellers' cheques and other documents. In many cases the thread is provided in a partially embedded or windowed fashion where the thread appears to weave in and out of the paper and is visible in windows in one or both surfaces of the base substrate. One method for producing paper with so-called windowed threads can be found in EP-A-0059056. EP-A-0860298 and WO-A-03095188 describe different approaches for the embedding of wider partially exposed threads into a paper substrate. Wide threads, typically having a width of 2 to 6 mm, are particularly useful as the additional exposed thread surface area allows for better use of optically variable devices, such as that presently disclosed.

The security device or article may be subsequently incorporated into a paper or polymer base substrate so that it is viewable from both sides of the finished security substrate. Methods of incorporating security elements in such a manner are described in EP-A-1141480 and WO-A-03054297. In the method described in EP-A-1141480, one side of the security element is wholly exposed at one surface of the substrate in which it is partially embedded, and partially exposed in windows at the other surface of the substrate.

Base substrates suitable for making security substrates for security documents may be formed from any conventional materials, including paper and polymer. Techniques are known in the art for forming substantially transparent regions in each of these types of substrate. For example, WO-A-8300659 describes a polymer banknote formed from a transparent substrate comprising an opacifying coating on both sides of the substrate. The opacifying coating is omitted in localised regions on both sides of the substrate to form a transparent region. In this case the transparent substrate can be an integral part of the security device or a separate security device can be applied to the transparent substrate of the document. WO-A-0039391 describes a method of making a transparent region in a paper substrate. Other methods for forming transparent regions in paper substrates are described in EP-A-723501, EP-A-724519, WO-A-03054297 and EP-A-1398174.

The security device may also be applied to one side of a paper substrate so that portions are located in an aperture formed in the paper substrate. An example of a method of producing such an aperture can be found in WO-A-03054297. An alternative method of incorporating a security element which is visible in apertures in one side of a paper substrate and wholly exposed on the other side of the paper substrate can be found in WO-A-2000/39391.

Examples of such documents of value and techniques for incorporating a security device will now be described with reference to FIGS. 16 to 19.

FIG. 16 depicts an exemplary document of value 50, here in the form of a banknote. FIG. 16a shows the banknote in plan view whilst FIG. 16b shows the same banknote in cross-section along the line X-X'. In this case, the banknote is a polymer (or hybrid polymer/paper) banknote, having a transparent substrate 51. Two opacifying layers 52a and 52b are applied to either side of the transparent substrate 51, which may take the form of opacifying coatings such as white ink, or could be paper layers laminated to the substrate 51.

The opacifying layers 52a and 52b are omitted across a region 55 which forms a window within which the security device is located. As shown best in the cross-section of FIG. 16b, an array of focusing elements 56 is provided on one side of the transparent substrate 51, and a corresponding elongate image element array 57 is provided on the opposite surface of the substrate. The focusing element array 56 and image element array 57 are each as described above with respect to any of the disclosed embodiments, such that at least two regions $R_1$ and $R_2$ are defined. When the document is viewed from the side of lens array 56, the aforementioned lenticular effect can be viewed upon tilting the device. It should be noted that in modifications of this embodiment the window 55 could be a half-window with the opacifying layer 52b continuing across all or part of the window over the image element array 57. In this case, the window will not be transparent but may (or may not) still appear relatively translucent compared to its surroundings. The banknote may also comprise a series of windows or half-windows. In this case the different regions of the security device defined by the elongate image elements could alternate along a series of half-windows, such that when tilting in one direction the optical effect is observed in one set of windows and then when tilting in a second direction the optical effect is observed in a second set of windows.

In FIG. 17 the banknote 50 is a conventional paper-based banknote provided with a security article 60 in the form of a security thread, which is inserted during paper-making such that it is partially embedded into the paper so that portions of the paper 53 and 54 lie on either side of the thread. This can be done using the techniques described in EP0059056 where paper is not formed in the window regions during the paper making process thus exposing the security thread in window regions 65 of the banknote. Alternatively the window regions 65 may for example be formed by abrading the surface of the paper in these regions after insertion of the thread. The security device is formed on the thread 60, which comprises a transparent substrate 63 with lens array 61 provided on one side and image element array 62 provided on the other. In the illustration, the lens array 61 is depicted as being discontinuous between each exposed region of the thread, although in practice typically this will not be the case and the security device will be formed continuously along the thread. Alternatively several security devices could be spaced from each other along the thread, with different or identical images displayed by each. In one example, a first window could contain a first region $R_1$ of the device, and a second region could contain a second region $R_2$ of the device, so that the two windows display different effects upon tilting in any one direction. For instance, the region $R_1$ may be configured to exhibit a lenticular effect when the document 50 is tilted about the X axis whilst the region $R_2$ remains static, and the region $R_2$ may be configured to exhibit a lenticular effect when the document is tilted about the Y axis whilst the region $R_1$ remains static. Alternatively the elongate image elements could be aligned along (different) directions sitting at a non-zero angle to the X and Y axes so that both window produce lenticular effects upon tilting, e.g. similar to the FIG. 10 embodiment.

In FIG. 18, the banknote 50 is again a conventional paper-based banknote, provided with a strip element or insert 60. The strip 60 is based on a transparent substrate 63 and is inserted between two plies of paper 53 and 54. The security device is formed by a lens array 61 on one side of the strip substrate 63, and an image element array 62 on the other. Again, at least two regions $R_1$ and $R_2$ are defined by the orientations of the elongate image elements. The paper plies 53 and 54 are apertured across region 65 to reveal the security device, which in this case may be present across the whole of the strip 60 or could be localised within the aperture region 65.

Figure 19A:
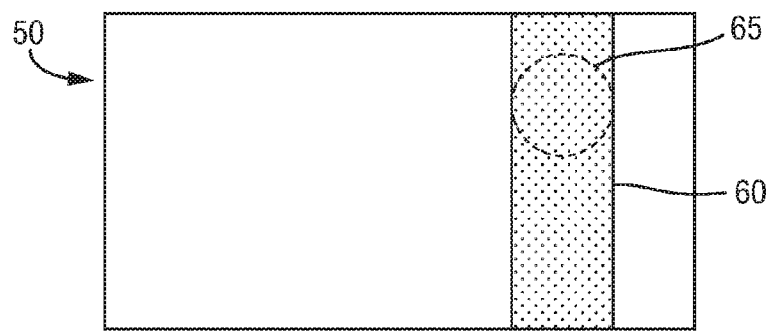
Figure 19C:
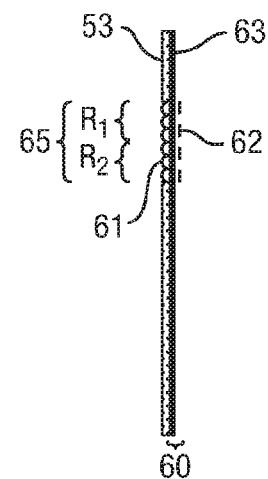
Figure 19B:
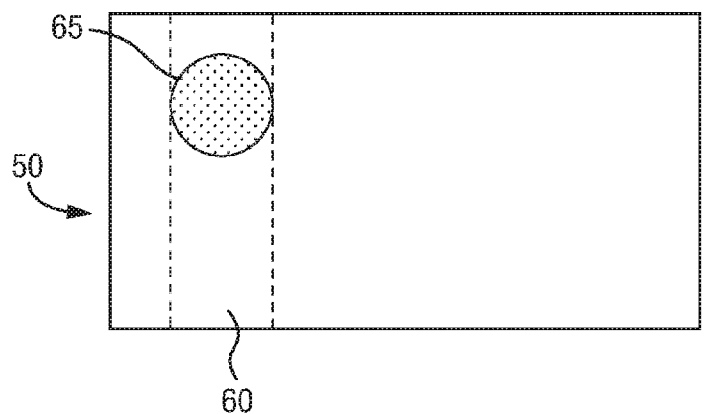

A further embodiment is shown in FIG 19 where FIGS. 19(a) and (b) show the front and rear sides of the document respectively, and FIG. 19(c) is a cross section along line Z-Z'. Security article 60 is a strip or band comprising a security device according to any of the embodiments described above. The security article 60 is formed into a security document 50 comprising a fibrous substrate 53, using a method described in EP-A-114180. The strip is incorporated into the security document such that it is fully exposed on one side of the document (FIG. 19(a)) and exposed in one or more windows 65 on the opposite side of the document (FIG. 19(b)). Again, the security device is formed on the strip 60, which comprises a transparent substrate 63 with a lens array 61 formed on one surface and image element array 62 defining at least two regions $R_1$ and $R_2$ formed on the other.

Alternatively a similar construction can be achieved by providing paper 53 with an aperture 65 and adhering the strip element 60 on to one side of the paper 53 across the aperture 65. The aperture may be formed during papermaking or after papermaking for example by die-cutting or laser cutting.

In general when applying a security article such as a strip or patch carrying the security device to a document, it is preferable to have the side of the device carrying the image element array bonded to the document substrate and not the lens side, since contact between lenses and an adhesive can render the lenses inoperative. However, the adhesive could be applied to the lens array as a pattern that the leaves an intended windowed zone of the lens array uncoated, with the strip or patch then being applied in register (in the machine direction of the substrate) so the uncoated lens region registers with the substrate hole or window It is also worth noting that since the device only exhibits the optical effect when viewed from one side, it is not especially advantageous to apply over a window region and indeed it could be applied over a non-windowed substrate. Similarly, in the context of a polymer substrate, the device is well-suited to arranging in half-window locations.

The security device of the current invention can be made machine readable by the introduction of detectable materials in any of the layers or by the introduction of separate machine-readable layers. Detectable materials that react to an external stimulus include but are not limited to fluorescent, phosphorescent, infrared absorbing, thermochromic, photochromic, magnetic, electrochromic, conductive and piezochromic materials.

Additional optically variable devices or materials can be included in the security device such as thin film interference elements, liquid crystal material and photonic crystal materials. Such materials may be in the form of filmic layers or as pigmented materials suitable for application by printing. If these materials are transparent they may be included in the same region of the device as the security feature of the current invention or alternatively and if they are opaque may be positioned in a separate laterally spaced region of the device.

The security device may comprise a metallic layer laterally spaced from the security feature of the current invention. The presence of a metallic layer can be used to conceal the presence of a machine readable dark magnetic layer. When a magnetic material is incorporated into the device the magnetic material can be applied in any design but common examples include the use of magnetic tramlines or the use of magnetic blocks to form a coded structure. Suitable magnetic materials include iron oxide pigments ($Fe_2O_3$ or $Fe_3O_4$), barium or strontium ferrites, iron, nickel, cobalt and alloys of these. In this context the term "alloy" includes materials such as Nickel:Cobalt, Iron:Aluminium:Nickel:Cobalt and the like. Flake Nickel materials can be used; in addition Iron flake materials are suitable. Typical nickel flakes have lateral dimensions in the range 5 -50 microns and a thickness less than 12 microns. Typical iron flakes have lateral dimensions in the range 10 -30 microns and a thickness less than 2 microns.

In an alternative machine-readable embodiment a transparent magnetic layer can be incorporated at any position within the device structure. Suitable transparent magnetic layers containing a distribution of particles of a magnetic material of a size and distributed in a concentration at which the magnetic layer remains transparent are described in WO03091953 and WO03091952.

Negative or positive indicia may be created in the metallic layer or any suitable opaque layer. One way to produce partially metallised/demetallised films in which no metal is present in controlled and clearly defined areas, is to selectively demetallise regions using a resist and etch technique such as is described in U.S. Pat. No. 4,652,015. Other techniques for achieving similar effects are for example aluminium can be vacuum deposited through a mask, or aluminium can be selectively removed from a composite strip of a plastic carrier and aluminium using an excimer laser. The metallic regions may be alternatively provided by printing a metal effect ink having a metallic appearance such as Metalstar® inks sold by Eckart.

The invention claimed is:

1. A security device comprising:
 an array of focusing elements, the focusing elements being arranged on a regular two-dimensional grid extending in two orthogonal directions, each focusing element being adapted to focus light in the two orthogonal directions; and
 an array of elongate image elements overlapping the array of focusing elements, configured such that each focusing element can direct light from any one of a respective set of at least two elongate image elements to the viewer, in dependence on the viewing angle;
 wherein in a first region of the security device, the elongate image elements extend along a first direction, and in a second region of the security device, the elongate image elements extend along a second direction which is different to the first direction.

2. A security device according to claim 1, wherein the first and second directions are orthogonal.

3. A security device according to claim 2, wherein, when viewed at at least one viewing angle, the first and second regions together present a recognisable image to the naked eye of the viewer made up by image portions from each region, wherein the elongate image elements define different views of the respective image portion such that as the security device is tilted about an axis parallel to either the first or second direction, the respective image portion from one of the regions appears to move laterally, while the other image portion remains stationary.

4. A security device according to claim 1, wherein the array of focusing elements is continuous across and between the first and second regions.

5. A security device according to claim 1, wherein the array of elongate image elements is continuous across and between the first and second regions.

6. A security device according to claim 1, wherein the first and second regions are arranged adjacent one another.

7. A security device according to claim 1, wherein the array of elongate image elements is configured such that the first region or the second region, or both, displays a series of at least two different images as the security device is tilted about an axis parallel to the direction along which the elongate image elements extend in the respective region.

8. A security device according to claim 7, wherein the or each image comprises one of a letter, number, symbol, character, logo, portrait or graphic.

9. A security device according to claim 1, wherein the array of elongate image elements is configured such that the first region or the second region, or both, displays a series of at least two different colours as the security device is tilted about an axis parallel to the direction along which the elongate image elements extend in the respective region.

10. A security device according to claim 9, wherein at at least one viewing position, the first and second regions both display the same colour such that the first and second regions have the same appearance.

11. A security device according to claim 9 wherein the relative arrangement of the first and second regions defines an image which is recognisable at at least one viewing angle due to contrast between the colour of the first region and the colour of the second region at that viewing angle.

12. A security device according to claim 1, wherein the array of elongate image elements is configured such that the first region or the second region, or both, displays the appearance of a moving image as the security device is tilted about an axis parallel to the direction along which the elongate image elements extend in the respective region.

13. A security device according to claim 1, wherein the array of focusing elements is registered to the array of elongate image elements.

14. A security device according to claim 1, wherein the security device is formed as a security thread, strip, foil, insert, label or patch.

15. An article provided with a security device according to claim 1.

16. An article according to claim 15, wherein the article is selected from banknotes, cheques, passports, identity cards, certificates of authenticity, fiscal stamps and other documents for securing value or personal identity.

17. An article according to claim 15, wherein the article comprises a substrate with a transparent portion, on opposite sides of which the focusing elements and elongate image elements respectively are provided.

18. A security device according to claim 1, wherein the regular two-dimensional grid on which the focusing elements are arranged is a square, rectangular or hexagonal grid.

19. A method of manufacturing a security device, the method comprising:
   providing an array of focusing elements, the focusing elements being arranged on a regular two-dimensional grid extending in two orthogonal directions, each focusing element being adapted to focus light in the two orthogonal directions; and
   overlapping an array of elongate image elements with the array of focusing elements, the array of elongate image elements being configured such that each focusing element can direct light from any one of a respective set of at least two elongate image elements to the viewer, in dependence on the viewing angle;
   wherein in a first region of the security device, the elongate image elements extend along a first direction, and in a second region of the security device, the elongate image elements extend along a second direction which is different to the first direction.

20. A method according to claim 19, wherein the first and second directions are orthogonal.

21. A method according to claim 19 adapted to manufacture a security device comprising:
   an array of focusing elements, each focusing element being adapted to focus light in at least two orthogonal directions, the focusing elements being arranged on a regular two-dimensional grid; and
   an array of elongate image elements overlapping the array of focusing elements, configured such that each focusing element can direct light from any one of a respective set of at least two elongate image elements to the viewer, in dependence on the viewing angle;
   wherein in a first region of the security device, the elongate image elements extend along a first direction, and in a second region of the security device, the elongate image elements extend along a second direction which is different to the first direction.

22. A method according to claim 19, wherein the regular two-dimensional grid on which the focusing elements are arranged is a square, rectangular or hexagonal grid.

* * * * *